United States Patent
Altenhoff et al.

(10) Patent No.: US 8,987,518 B2
(45) Date of Patent: Mar. 24, 2015

(54) POLYAMINES AND PROCESS FOR PREPARATION THEREOF

(71) Applicant: BASF SE, Ludwigshafen (DE)

(72) Inventors: Ansgar Gereon Altenhoff, Heidelberg (DE); Christoph Mueller, Mannheim (DE); Christian Mueller, Mannheim (DE); Andreas Kunst, Ludwigshafen (DE); Thomas Reissner, Mannheim (DE); Kirsten Dahmen, Bad Duerkheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/190,784

(22) Filed: Feb. 26, 2014

(65) Prior Publication Data
US 2014/0243557 A1 Aug. 28, 2014

Related U.S. Application Data

(60) Provisional application No. 61/770,428, filed on Feb. 28, 2013.

(51) Int. Cl.
| | | |
|---|---|---|
| *C07C 209/60* | (2006.01) | |
| *C07C 211/13* | (2006.01) | |
| *C08G 73/02* | (2006.01) | |
| *C09J 179/02* | (2006.01) | |

(52) U.S. Cl.
CPC .................................. *C09J 179/02* (2013.01)
USPC ............ 564/470; 564/511; 564/512; 528/422

(58) Field of Classification Search
None
See application file for complete search history.

(56) References Cited

U.S. PATENT DOCUMENTS

| | | | |
|---|---|---|---|
| 4,035,311 A | 7/1977 | Feichtmayr et al. | |
| 4,044,053 A | 8/1977 | Brennan et al. | |
| 4,216,307 A | 8/1980 | Yuasa et al. | |
| 4,309,324 A | 1/1982 | Yuasa et al. | |
| 4,374,243 A | 2/1983 | Yuasa et al. | |
| 8,188,318 B2 * | 5/2012 | Petraitis et al. | 564/470 |
| 2004/0171884 A1 | 9/2004 | Lif et al. | |
| 2007/0100144 A1 | 5/2007 | Frauenkron et al. | |
| 2012/0232180 A1 | 9/2012 | Kunst et al. | |
| 2012/0245389 A1 | 9/2012 | Wigbers et al. | |
| 2012/0245390 A1 | 9/2012 | Wigbers et al. | |
| 2012/0259030 A1 | 10/2012 | Kunst et al. | |
| 2013/0190418 A1 | 7/2013 | Kunst et al. | |
| 2013/0231413 A1 | 9/2013 | Kunst et al. | |

FOREIGN PATENT DOCUMENTS

| | | |
|---|---|---|
| DE | 1 037 126 | 8/1958 |
| DE | 24 39 275 A1 | 3/1976 |
| DE | 26 24 135 A1 | 12/1976 |
| DE | 25 40 870 A1 | 3/1977 |
| DE | 25 40 871 A1 | 3/1977 |
| DE | 26 05 212 A1 | 8/1977 |
| DE | 28 42 264 A1 | 4/1979 |
| DE | 10 2005 050 283 A1 | 4/2007 |
| EP | 0 636 409 A1 | 2/1995 |
| EP | 0 696 572 A1 | 2/1996 |
| EP | 0 742 045 A1 | 11/1996 |
| EP | 0 963 975 A1 | 12/1999 |
| GB | 1 508 460 | 4/1978 |
| GB | 1 551 127 | 8/1979 |
| JP | 49-102800 | 9/1974 |
| WO | WO 92/17437 | 10/1992 |
| WO | WO 2011/151268 A1 | 12/2011 |
| WO | WO 2012/119970 A2 | 9/2012 |
| WO | WO 2012/126869 A1 | 9/2012 |
| WO | WO 2012/126956 A1 | 9/2012 |
| WO | WO 2012/136608 A1 | 10/2012 |
| WO | WO 2013/039907 A1 | 3/2013 |
| WO | WO 2013/110512 A1 | 8/2013 |
| WO | WO 2013/127647 A1 | 9/2013 |
| WO | WO 2013/189745 A2 | 12/2013 |

OTHER PUBLICATIONS

U.S. Appl. No. 14/069,759, filed Nov. 1, 2013, Christian Mueller et al.
U.S. Appl. No. 14/164,378, filed Jan. 27, 2014, Achim Kaffee et al.
European Search Report issued Jul. 1, 2013, in European Application No. 13 15 7314 (with English Translation of Categories of Cited Documents).
S. Kobayashi, "Ethylenimine Polymers", Prog. Polym. Sci., vol. 15, 1990, 73 pages.
International Search Report and Written Opinion issued May 9, 2014 in PCT/EP2014/053061 (with English translation of Categories of Cited Documents).

* cited by examiner

*Primary Examiner* — Brian J Davis
(74) *Attorney, Agent, or Firm* — Oblon, McClelland, Maier & Neustadt, L.L.P.

(57) ABSTRACT

The present invention relates to polyamines and to a process for preparing polyamines.

22 Claims, 6 Drawing Sheets

POLYAMINES AND PROCESS FOR PREPARATION THEREOF

The present invention relates to polyamines and to a process for preparing polyamines.

Polyamines refer generally to polymers having aminic repeat units R—NH—R or R—NR—R in the chain.

Such polyamines are generally prepared by polymerization of diamines, amino alcohols, cyclic imines such as aziridines, and cyclic imino ethers such as 2-oxazolines.

Polyamines in which NH groups each separated from one another by two methylene groups are present in the main chains

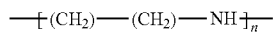

are generally referred to as polyethyleneimines (PEIs).

Polyethyleneimines are valuable products having a multitude of different uses. For example, polyethyleneimines are used
a) as adhesion promoters, for example for printing inks for laminate films;
b) as an assistant (adhesion), for example for production of multilayer composite films, with compatibilization not just of different polymer layers but also of metal foils;
c) as adhesion promoters for adhesives, for example in conjunction with polyvinyl alcohol, butyrate and acetate and styrene copolymers, or as a cohesion promoter for label adhesives;
d) as a primer in coatings applications for improvement of adhesion on substrates such as glass, wood, plastic and metal;
e) for improvement of wet adhesion, for example in standard emulsion paints, and for improvement of instantaneous rain resistance of paints, for example for road markings;
f) as complexing agents, especially with high binding capacity for heavy metals such as Hg, Pb, Cu, Ni;
g) as a flocculant, for example in water treatment/water processing;
h) as a penetration aid, for example for active metal salt formulations in wood protection;
i) as corrosion inhibitors, for example for iron and nonferrous metals and in the sectors of petroleum production and of secondary oil production;
j) for immobilization of proteins and enzymes; microorganisms or as immobilizing supports of enzymes and microorganisms;
k) for blocking and sealing, for example mineral oil and natural gas industry;
l) as fixatives, for example in the textile industry, especially as formaldehyde-free co-fixers;
m) as an additive in the cosmetics sector, for example for hair-setting compositions and hair rinses;
n) as an assistant in the papermaking industry, for example for acceleration of dewatering, elimination of contraries, neutralization of charge and paper coating as a multipurpose assistant;
o) for separation of oil and water, for example in the metalworking industry;
p) as an additive for landfill seals;
q) as a flocculant;
r) as a swimming pool algaecide;
s) for production of bitumen chemicals by reaction with fatty acids;
t) as an antiswelling agent in order that clay absorbs water in a retarded manner;
u) as an emulsifier or emulsion breaker;
v) as a surfactant in the industrial cleaning (IC) sector;
w) as a wood protector;
x) for preparation of complexing agents (polycarboxylates);
y) for production of assistants for ore mining and mineral processing;
z) as a dispersant for pigments, ceramic, carbon black, carbon, carbon fibers, metal powders;
aa) for gas scrubbing as an absorbent of $CO_2$, $NO_x$, $SO_x$, $Cl_2$ and aldehydes, and for neutralization of acidic constituents;
bb) for water softening;
cc) as a crystallization inhibitor;
dd) as a rheology modifier (thickener);
ee) as an assistant or as a component for assistants for the extraction and processing of oil, coal and natural gas;
ff) for production of synthetic rubber and rubber chemicals;
gg) as an additive in coolants, lubricants and cooling lubricants;
hh) as assistants in the construction chemicals sector;
ii) as a constituent of galvanizing baths; or
jj) for production of nonviral gene vectors.

For these applications, it is also possible to use other polyalkylenepolyamines not derived from ethyleneimine.

Polyethyleneimines are generally prepared by ring-opening polymerization of unsubstituted or substituted 2-oxazolines of the formula A

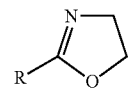

(A)

or unsubstituted or N-substituted aziridines of the formula B

(B)

The preparation of polyethyleneimines is described in detail, for example, in the review article by S. Kobayashi (Prog. Polym. Sci., Vol. 15, 751-823, 1990).

By cationic polymerization of 2-oxazolines and subsequent alkaline hydrolysis, it is possible to obtain very substantially unbranched linear polyethyleneimines (LPEIs). Linear polyethyleneimines are generally crystalline (melting temperature approximately 59° C.) and generally dissolve only in hot water.

The ring-opening polymerization of aziridines generally leads to highly branched polyethyleneimines (BPEIs). In these polymers, the ratio of primary amines, secondary amines and tertiary amines is about 25:50:25 (Kobayashi, supra, p. 758).

As well as the ring opening of aziridine, the ring opening of further cyclic imines is also known. For example, DE-1 037 126 disclosed that hexamethyleneimine (hexahydro-1H-azepine) can be polymerized using an acidic catalyst. The polymerization was effected at high temperatures in the range from 200 to 300° C. However, the polymers thus obtained had only a low degree of polymerization.

Ring-opening polymerization requires the use of cyclic monomers as starting material. Only few cyclic monomers suitable for the preparation of polyamines are available commercially and inexpensively or in any great volumes. Other cyclic imines, especially ethyleneimine, require complex handling, since they have highly reactive, toxic or corrosive properties.

It is likewise necessary to ensure that no ethyleneimine remains in the products or wastewater streams obtained.

For the preparation of non-aziridine-derived polyalkylene-polyamines —[$(CH_2)_xN$]— with alkylene groups >$C_2$ (x>2), there is no process which is analogous to the aziridine route and is practiced on the industrial scale, as a result of which there is no inexpensive process to date for preparation thereof.

An alternative preparation route for obtaining polyamines is the polymerization of diamines and diols or amino alcohols. The polymerization can be catalyzed homogeneously or heterogeneously.

The homogeneously catalyzed preparation of polyamines is described, for example, in DE-A 26 24 135 or WO 2011/151268.

DE-A 26 24 135 discloses the preparation of polyalkylenepolyamines by reaction of alkylenediamines with diols in the presence of phosphoric acid, or anhydrides, metal salts and esters thereof, at temperatures of 250 to 350° C. in the liquid phase.

WO 2011/151268 describes a process for preparing polyalkylenepolyamines by catalyzed alcohol amination, in which aliphatic amino alcohols are reacted with one another, or aliphatic diamines or polyamines with aliphatic diols or polyols, with elimination of water in the presence of a catalyst. The catalysts used are ruthenium or iridium compounds dissolved homogeneously in the reaction medium and comprising a monodentate or polydentate phosphine ligand.

In the homogeneously catalyzed preparation of polyamines, the catalyst generally remains in the polymerization product. Catalytically active metals remaining in the polymer can lead to degradation reaction in the polymer or affect the processability of the polymer, especially when the polymer is reacted with crosslinkers or chain extenders. In addition, remaining residual metal can lead to high production costs if the catalyst comprises a metal or noble metal having a high market value. Alternatively, the homogeneously dissolved catalyst can be removed. However, such removal processes are technically complex and likewise contribute to an increase in the production costs. Owing to side reactions which may also be catalyzed by the catalyst remaining in the polymer, the homogeneously prepared polyamines may frequently be colored. In addition, polyamines having a low molecular weight and/or a high degree of branching are generally obtained by means of homogeneous catalysis. These properties can restrict the end uses of the polyamines thus produced.

The heterogeneously catalyzed preparation of polyamines from alkylenediamines is described in several patent specifications.

DE 2439275 and DE 254087 describe the conversion of ethylenediamine and 1,3-propylenediamine to oligomers having a low degree of oligomerization. DE 2439275 discloses converting ethylenediamine to diethylenetriamine (DETA) and triethylenetetramine (TETA) at 100 to 150° C. in the presence of metals of the eighth to eleventh transition groups of the periodic table of the elements as catalysts. The catalysts mentioned explicitly are catalysts comprising copper and nickel, or copper, nickel and cobalt. The conversion is effected at 100 to 150° C., preferably in the presence of hydrogen. The hydrogen pressure is variable within wide limits. It may be up to 250 bar. The conversion can be performed batchwise or continuously. The residence time in continuous mode is 5 to 10 hours. The conversion of ethylenediamine is less than 70%. DE 2540871 is a further configuration of DE 2439275. Rather than ethylenediamine, 1,3-propylenediamine is used and is converted to dipropylenetriamine and tripropylenetetramine under similar conditions to those used in DE 2439275. Operation is effected at 50 to 250° C., pressures of 1 to 500 bar and residence times of 1 to 4 hours.

It is clear from a further configuration of DE 2540871, namely DE 2605212, that the conversion of 1,2- or 1,3-propylenediamine can be conducted up to any conversion. It is stated that waxy polypropylenepolyamines are obtained at about 180° C.

WO 92/17437 discloses polymers of hexamethylenediamine, the preparation thereof and the use thereof as lubricants. The polymerization is performed in the range of 100-230° C. at standard pressure over nickel catalysts such as Raney nickel. It is disclosed that the ammonia formed in the course of polycondensation should preferably be removed from the reactor. In the examples, it is stated that the polymerization products are brown in color and have a mean degree of oligomerization of 2 to 5, the main component formed being the dimer.

JP 49102800 discloses the batchwise polymerization of diamines of the

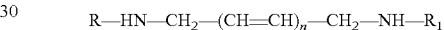

type in which n=0 or >1 and R and $R_1$ are each hydrogen or hydrocarbyl radicals, in the presence of palladium, rhodium or compounds thereof. From ethylenediamine (n=0, R and $R_1$=H), a viscous polymer was obtained at 200° C. and 7 atm with a reaction time of 11 hours in the presence of palladium.

DE 2842264 describes a process for preparing oligo- and polyhexamethylenepolyamines by conversion of hexamethylenediamine in the presence of a palladium catalyst from the group of metallic palladium and palladium compounds. According to the disclosure, the conversion is effected at 50 to 300° C. at atmospheric pressure or elevated pressures using ammonia or nitrogen. The process can be performed continuously or batchwise. In batchwise mode, as soon as the pressure has risen as a result of the formation of ammonia, it is maintained by decompression at about less than 5 to 8 bar (Examples 2, 1 and 3). According to the description, the polyhexamethylenepolyamines thus obtained have a mean molecular weight of 500 to 20 000 g/mol and are very substantially linear, since more than 70% of the monomers in the polymer are present bonded as secondary amines. In the examples, yellowish-white polymers having an average molecular weight in the range from about less than 500 up to 3000 g/mol are obtained.

Figure 1:
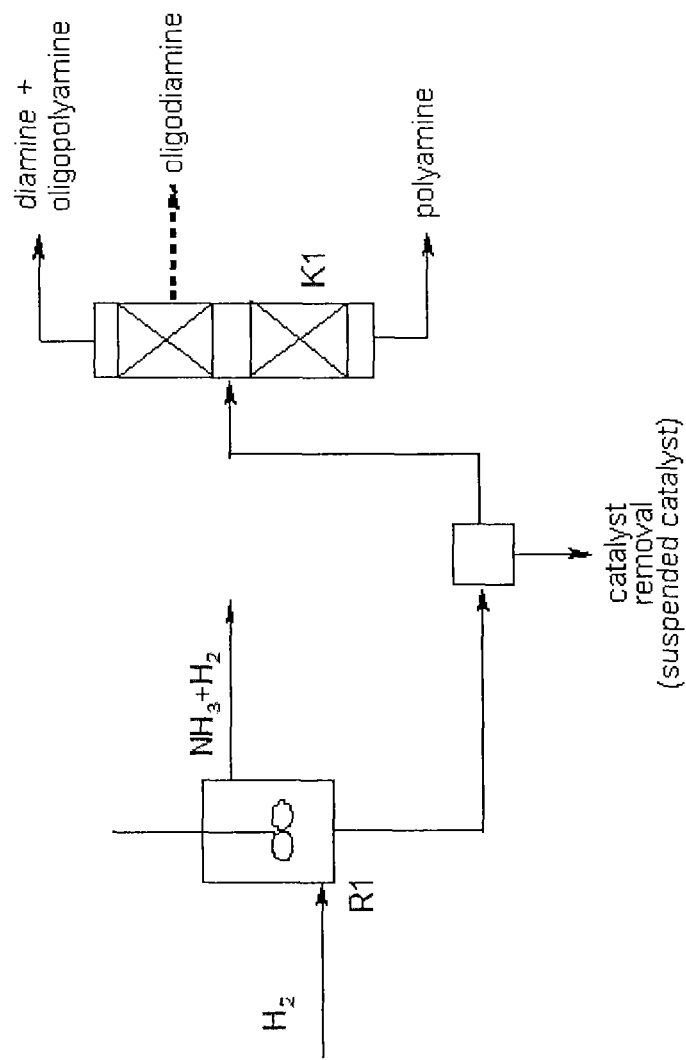
FIG. 1 shows a batchwise process in which monomer is initially charged in a stirred tank reactor R 1 comprising the catalyst in suspended or fixed form.

It was an object of the present invention to provide a process for preparing polyamines, which enables the use of a multitude of monomers, such that a great multitude of homo- and copolyamines can be achieved (through the choice of monomers, the properties of the polyamines prepared can be tailored), enables the use of monomers which are available commercially and/or inexpensively and/or can be handled without a high level of safety measures, or which are advantageous in terms of their toxicological properties, enables the preparation of polyamines from bifunctional monomers which are essentially linear and have a low level of branching, enables the preparation of polyamines having a low metal content, enables the preparation of polyamines having a low phosphorus content, enables the preparation of polyamines which are essentially colorless or have only a low degree of color, enables the preparation of polyamines having a high mean degree of polymerization, enables the preparation of polyamines having a low OH number combined with a high charge density, enables the preparation of polyamines with a low degree of deamination, enables the preparation of polyamines having a low chloride content, enables the preparation of polyamines having both a low degree of branching and a high mean degree of polymerization.

In addition, the process should have comparatively short residence times or reaction times, the catalyst used for polymerization should be removable from polymer in a simple manner and be reusable for further polymerizations, the service life and activity of the catalyst in the process should be high, such that the frequency of complex catalyst exchanges can be reduced, a high degree of polymerization or a high conversion of diamines should be achieved with short residence times, the recycling of unconverted diamine should be enabled, the degree of side reactions should be kept as low as possible, and/or a process which can also be operated continuously should be provided.

The object was achieved by a process for preparing polyamines in a reactor by conversion of diamines present in the liquid phase in the presence of a catalyst present in the solid phase, which comprises supplying a gas to the reactor, the amount of gas supplied being 1 to 1000 liters of gas per liter of free reactor volume per hour, and introducing the gas into the liquid phase and removing the gas from the reactor together with ammonia which is formed in the conversion.

Reactants

The starting compounds used are preferably diamines (also referred to hereinafter as "monomers").

Particular preference is given to using aliphatic alkylenediamines having 2 or more carbon atoms in the alkylene chain.

Particularly preferred aliphatic alkylenediamines can be described by formula I

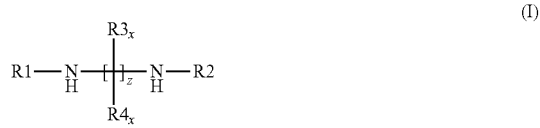

(I)

and the radicals may be defined as follows:

R1 and R2 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;

$R3_x$ and $R4_x$ are simultaneously or each independently hydrogen, linear or branched $C_1$- to $C_{12}$-alkyl, $C_7$- to $C_{12}$-aralkyl, $C_3$- to $C_{10}$-aryl, $C_3$- to $C_8$-cycloalkyl or $C_3$- to $C_8$-cycloalkyl in which one $CH_2$ group has been replaced by O, NH or NR10;

R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;

z is a value from 2 to 20, preferably from 3 to 20;

and x is an index which can assume all values from 1 to z.

Preferably, R1, R2, $R3_x$ and $R4_x$ are each hydrogen and z is a value from 2 to 8; more preferably, R1, R2, $R3_x$ and $R4_x$ each hydrogen and z is a value from 3 to 8.

Very particularly preferred aliphatic alkylenediamines are ethylenediamine, 1,3-propylenediamine, 1,2-propylenediamine, 1,4-butylenediamine, 1,2-butylenediamine, 1,5-diaminopentane, 1,2-diaminopentane, 1,5-diamino-2-methylpentane, 1,6-diaminohexane, 1,2-diaminohexane, 1,7-diaminoheptane, 1,2-diaminoheptane, 1,8-diaminooctane, 1,2-diaminooctane, 1,9-nonamethylenediamine, 1,10-decamethylenediamine, 1,2-diaminodecane, 1,11-undecamethylenediamine, 1,2-diaminoundecane, 1,12-dodecamethylenediamine, 1,2-diaminododecane, 2,2-dimethylpropane-1,3-diamine, 4,7,10-trioxatridecane-1,13-diamine, 4,9-dioxadodecane-1,12-diamine and 3-(methylamino)propylamine, or mixtures thereof.

Very particular preference is given in particular to the process when ethylenediamine is used only in mixtures with the above aliphatic alkylenediamines. Very particular preference is given in particular to the process according to the invention when the use of ethylenediamine as the sole diamine is excluded.

Further preferred diamines are oligomeric polyalkyleneamines of 2 to 5 amine units consist, or mixtures thereof.

Particularly preferred oligomeric polyalkyleneamines can be described by formula II

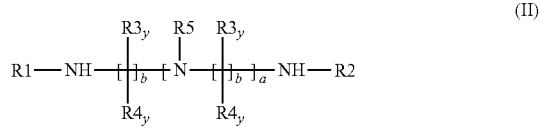

(II)

and the radicals are each defined as follows:

R1, R2, $R3_y$, $R4_y$ and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;

R10 is as defined above;

a) is a value of 2 to 5;

b) is a value of 2 to 12;

and y is an index which can assume all values between 1 and b.

Very particularly preferred polyalkyeneamines are N,N-bis(3-aminopropyl)methylamine, N,N'-bis(3-aminopropyl)ethylenediamine, 3-(2-aminoethyl-amino)propylamine, diethylenetriamine (DETA), triethylenetetramine (TETA), tetraethylenepentamine (TEPA), di-1,3-propylenetriamine, tri-1,3-propylenetetramine and tetra-1,3-propylenepentamine, di-1,2-propylenetriamine, tri-1,2-propylenetetramine and tetra-1,2-propylenepentamine, dihexamethylenetriamine, trihexamethylenetetramine and tetrahexamethylenepentamine.

Further preferred diamines are cyclic diamines in which the amino groups are joined either directly or indirectly to one or more mutually connected unsubstituted or substituted cycloaliphatic or heteroaliphatic, aromatic or heteroaromatic rings.

Particularly preferred cyclic diamines are alicyclic diamines.

Preferred alicyclic diamines are 3,3'-dimethyl-4,4'-diaminodicyclohexylmethane, 4,4'-diaminodicyclohexylmethane, isophoronediamine, 1,3-bis(aminomethyl)cyclohexane, bis (4-aminocyclohexyl)methane, bis(4-amino-3,5-dimethylcyclohexyl)methane or bis(4-amino-3-methylcyclohexyl) methane, 3-(cyclohexylamino)propylamine, bis(aminoethyl) piperazine and bis(aminomethyl)piperazine.

Particularly preferred aromatic cyclic diamines aromatic diamines in which the amino group is not substituted directly on the aromatic ring.

Preferred aromatic diamines are the isomeric bis(aminomethyl)benzens, especially meta-xylenediamine (MXDA), or isomers of aminobenzylamine (2-aminobenzylamine, 4-aminobenzylamine), 4-(2-aminoethyl)aniline, m-xylylenediamine, o-xylylenediamine, or 2,2'-biphenyldiamines, or oxydianilines, for example 4,4'-oxydianiline, isomers of diaminofluorene, isomers of diaminophenanthrene and 4,4'-ethylenedianiline.

Further preferred diamines are polyetheramines of the formula III

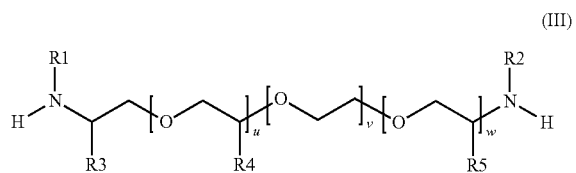

and the radicals are each defined as follows:

R1 and R2 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;

R3, R4 and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;

R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;

u, v and w are each independently a value from 0 to 100.

Preferably, u and w each assume a value of 0 and v assumes a value >0, and the substituents R1 to R5 are preferably hydrogen (polyetheramines based on ethylene glycol).

Additionally preferably, v assumes a value of 0 and (u+w) a value of >0, and the substituents R1 and R2 are preferably hydrogen and the substituents R3 to R5 are preferably methyl (polyetheramines based on propylene glycol).

Additionally preferably, v assumes a value of >0 and (u+w) a value of >0, and the substituents R1 to R2 are preferably hydrogen and the substituents R3 to R5 are preferably methyl (block polyetheramines having a central block based on polyethylene glycol and outer blocks based on propylene glycol).

Very particularly preferred polyether diamines are 4,7,10-trioxatridecane-1,13-diamine, 4,9-dioxadodecane-1,12-diamine and what are called Jeffamines® from Huntsman, especially Jeffamine D230, Jeffamine D400, Jeffamine D2000, Jeffamine D4000, Jeffamine ED600, Jeffamine ED900, Jeffamine ED2003, Jeffamine EDR148 and Jeffamine EDR176 (names from the product brochure from Alfa Chemicals Ltd with reference number "Hunt32").

It is possible with preference to use 80 mol % or more, more preferably 90 mol % or more, even more preferably 95 mol % or more and especially preferably 99 mol % or more of the abovementioned bifunctional monomers in the process.

Most preferably, aside from diamines, no further monomers are used in the process.

Catalyst

The catalysts used for the conversion of diamines to polyamines may especially be catalysts comprising one or more elements of transition group 8 of the periodic table (Fe, Co, Ni, Ru, Rh, Pd, Os, Ir, Pt), preferably Co, Ni, Ru, Cu or Pd, more preferably Co, Ni and/or Cu (also referred to hereinafter as catalytically active metals).

The abovementioned catalysts may be doped in a customary manner with promoters, for example with chromium, iron, cobalt, manganese, molybdenum, titanium, tin, metals of the alkali metal group, metals of the alkaline earth metal group and/or phosphorus.

The catalysts used may preferably be what are called skeletal catalysts (also referred to as Raney® type, hereinafter also: Raney catalysts), which are obtained by leaching out (activating) an alloy composed of catalyst, reactive metal and a further component (preferably Al). Preference is given to using Raney nickel catalysts or Raney cobalt catalysts.

The catalysts used are additionally preferably supported Pd or Pt catalysts. Preferred support materials are activated carbon, $Al_2O_3$, $TiO_2$, $ZrO_2$ and $SiO_2$.

Most preferably, catalysts which are prepared by reduction of what are called catalyst precursors are used in the process according to the invention.

The catalyst precursor comprises an active composition comprising one or more catalytically active components, optionally promoters and optionally a support material.

The catalytically active components are oxygen compounds of the abovementioned catalytically active metals, for example and the metal oxides or hydroxides thereof, such as CoO, NiO, CuO and/or mixed oxides thereof.

In the context of this application, the term "catalytically active components" is used for the abovementioned oxygen-containing metal compounds, but is not supposed to imply that these oxygen compounds are themselves already catalytically active. The catalytically active components generally have catalytic activity in the inventive conversion only after reduction.

Particular preference is given to catalyst precursors comprise one or more oxides of the elements Cu, Co and Ni, such as the oxide mixtures which are disclosed in EP-A-0636409 and which comprise, prior to reduction with hydrogen, 55 to 98% by weight of Co, calculated as CoO, 0.2 to 15% by weight of phosphorus, calculated as $H_3PO_4$, 0.2 to 15% by weight of manganese, calculated as $MnO_2$, and 0.2 to 15% by weight of alkali metal, calculated as $M_2O$ (M=alkali metal), or oxide mixtures which are disclosed in EP-A-0742045 and which comprise, prior to reduction with hydrogen, 55 to 98% by weight of Co, calculated as CoO, 0.2 to 15% by weight of phosphorus, calculated as $H_3PO_4$, 0.2 to 15% by weight of manganese, calculated as $MnO_2$, and 0.05 to 5% by weight of alkali metal, calculated as $M_2O$ (M=alkali metal), or oxide mixtures which are disclosed in EP-A-696572 and which comprise, prior to reduction with hydrogen, 20 to 85% by weight of $ZrO_2$, 1 to 30% by weight of oxygen compounds of copper, calculated as CuO, 30 to 70% by weight of oxygen compounds of nickel, calculated as NiO, 0.1 to 5% by weight of oxygen compounds of molybdenum, calculated as $MoO_3$, and 0 to 10% by weight of oxygen compounds of aluminum and/or manganese, calculated as $Al_2O_3$ and $MnO_2$ respectively, for example the catalyst disclosed in loc. cit., page 8, with the composition of 31.5% by weight of $ZrO_2$, 50% by weight of NiO, 17% by weight of CuO and 1.5% by weight of $MoO_3$, or oxide mixtures which are disclosed in EP-A-963975 and which comprise, prior to reduction with hydrogen, 22 to 45% by weight of $ZrO_2$, 1 to 30% by weight of oxygen compounds of copper, calculated as CuO, 15 to 50% by weight of oxygen compounds of nickel, calculated as NiO, where the molar Ni:Cu ratio is greater than 1, 15 to 50% by weight of oxygen compounds of cobalt, calculated as CoO, 0 to 10% by weight of oxygen compounds of aluminum and/or manganese, calculated as $Al_2O_3$ and $MnO_2$ respectively, and no oxygen compounds of molybdenum, for example the catalyst A disclosed in loc. cit., page 17, with the composition of 33% by weight of Zr, calculated as $ZrO_2$, 28% by weight of Ni, calculated as NiO, 11% by weight of Cu, calculated as CuO and 28% by weight of Co, calculated as CoO.

In a very particularly preferred embodiment, 50 to 100 mol %, more preferably 60 to 99 mol % and most preferably 75 to 98 mol % of the catalytically active metals present in the catalytically active composition are one or more metals selected from the group consisting of Cu, Co and Ni.

The molar ratio of the atoms of the components of the active composition relative to one another can be measured by means of known methods of elemental analysis, for example of atomic absorption spectrometry (AAS), of atomic emission spectrometry (AES), of X-ray fluorescence analysis (XFA) or of ICP-OES (Inductively Coupled Plasma Optical Emission Spectrometry). The molar ratio of the atoms of the components of the active composition relative to one another can also be determined by calculation, for example by determining the starting weights of the compounds used which comprise the components of the active composition and determining the proportions of the atoms in the components of the active composition on the basis of the known stoichiometry of the compounds used, such that it is possible to calculate the atomic ratio from the starting weights and the stoichiometric formula of the compound used. Of course, the stoichiometric formula of the compounds used can also be determined experimentally, for example by one or more of the abovementioned methods.

According to the process conducted (suspension polymerization, fluidized bed process, fixed bed polymerization), the catalysts are used in the form of powder, spall or shaped bodies (preferably extrudates or tablets).

The catalysts or catalyst precursors are preferably used in the form of shaped bodies in the process according to the invention.

Suitable shaped bodies are those having any geometry or shape. Preferred shapes are tablets, rings, cylinders, star extrudates, wagonwheels, or spheres. Particular preference is given to tablets, rings, cylinders, spheres or star extrudates. Extrudate form is very particularly suitable.

Impregnation

In a preferred embodiment, the catalysts are used in the process according to the invention in the form of shaped bodies which are prepared by saturation (impregnation) of support materials which have the abovementioned geometry or which are shaped after impregnation to shaped bodies having the abovementioned geometry.

Useful support materials include, for example, carbon such as graphite, carbon black, graphene, carbon nanotubes and/or activated carbon, aluminum oxide (gamma, delta, theta, alpha, kappa, chi or mixtures thereof), silicon dioxide, zirconium dioxide, zeolites, alumosilicates or mixtures thereof.

The abovementioned support materials can be impregnated by the customary processes (A. B. Stiles, Catalyst Manufacture—Laboratory and Commercial Preparations, Marcel Dekker, New York, 1983), for example by application of a metal salt solution in one or more impregnation stages. Useful metal salts generally include water-soluble metal salts such as the nitrates, acetates or chlorides of the corresponding catalytically active components or dopant elements, such as cobalt nitrate or cobalt chloride. Thereafter, the impregnated support material is generally dried and optionally calcined.

The calcination is executed generally at temperatures between 300 and 800° C., preferably 350 to 600° C., especially at 450 to 550° C.

The impregnation can also be effected by the "incipient wetness method", in which the support material is moistened with the impregnation solution up to a maximum of saturation, according to its water absorption capacity. However, the impregnation can also be effected in supernatant solution.

In the case of multistage impregnation processes, it is appropriate to dry and optionally to calcine between individual impregnation steps. Multistage impregnation should be employed advantageously when the support material is to be contacted with metal salts in a relatively large amount.

For application of several metal components to the support material, the impregnation can be effected simultaneously with all metal salts or in any sequence of the individual metal salts successively.

Preference is given to using support materials which already have the above-described preferred geometry of the shaped bodies.

However, it is also possible to use support materials present in the form of powder or spall, and to subject impregnated support materials to shaping.

For example, the impregnated and dried or calcined support material can be conditioned.

The conditioning can be effected, for example, by adjusting the impregnated support material to a particular particle size by grinding.

After grinding, the conditioned, impregnated support material can be mixed with shaping aids such as graphite or stearic acid, and processed further to give shaped bodies.

Standard processes for shaping are described, for example, in Ullmann [Ullmann's Encyclopedia Electronic Release 2000, chapter: "Catalysis and Catalysts", pages 28-32] and by Ertl et al. [Ertl, Knözinger, Weitkamp, Handbook of Heterogeneous Catalysis, VCH Weinheim, 1997, pages 98 ff].

Standard processes for shaping are, for example, extrusion, tableting, i.e. mechanical pressing, or pelletizing, i.e. compaction by circular and/or rotating movements.

The shaping operation can give shaped bodies with the abovementioned geometry.

The conditioning or shaping is generally followed by a heat treatment. The temperatures in the heat treatment typically correspond to the temperatures in the calcination.

Coprecipitation

In a further preferred embodiment, shaped bodies which are produced by coprecipitation of all the components thereof, the catalyst precursors thus precipitated being subjected to a shaping operation, are used in the process according to the invention.

For this purpose, a soluble compound of the corresponding active component, the doping elements and optionally a soluble compound of a support material in a liquid is admixed while heating and stirring with a precipitant until precipitation is complete.

The liquid used is generally water.

Useful soluble compounds of the active components typically include the corresponding metal salts, such as the nitrates, sulfates, acetates or chlorides, of the aforementioned metals.

The soluble compounds of a support material used are generally water-soluble compounds of Ti, Al, Zr, Si etc., for example the water-soluble nitrates, sulfates, acetates or chlorides of these elements.

The soluble compounds of the doping elements used are generally water-soluble compounds of the doping elements, for example the water-soluble nitrates, sulfates, acetates or chlorides of these elements.

Typically, in the precipitation reactions, the soluble compounds are precipitated as sparingly soluble or insoluble, basic salts by addition of a precipitant.

The precipitants used are preferably alkalis, especially mineral bases, such as alkali metal bases. Examples of precipitants are sodium carbonate, sodium hydroxide, potassium carbonate or potassium hydroxide.

The precipitants used may also be ammonium salts, for example ammonium halides, ammonium carbonate, ammonium hydroxide or ammonium carboxylates.

The precipitation reactions can be performed, for example, at temperatures of 20 to 100° C., particularly 30 to 90° C., especially at 50 to 70° C.

The precipitates obtained in the precipitation reactions are generally chemically inhomogeneous and generally comprise mixtures of the oxides, oxide hydrates, hydroxides, carbonates and/or hydrogencarbonates of the metals used. It may be found to be favorable for the filterability of the precipitates if they are aged, i.e. if they are left alone for a certain time after the precipitation, optionally while heating or while passing air through.

The precipitates obtained by these precipitation processes are typically processed, by washing, drying, calcining and conditioning them.

After washing, the precipitates are generally dried at 80 to 200° C., preferably 100 to 150° C., and then calcined.

The calcination is executed generally at temperatures between 300 and 800° C., preferably 350 to 600° C., especially at 450 to 550° C.

After the calcination, the pulverulent catalyst precursors obtained by precipitation reactions are typically conditioned.

The conditioning can be effected, for example, by adjusting the precipitation catalyst to a particular particle size by grinding.

After grinding, the catalyst precursor obtained by precipitation reactions can be mixed with shaping assistants such as graphite or stearic acid and processed further to give shaped bodies.

Standard processes for shaping are described, for example, in Ullmann [Ullmann's Encyclopedia Electronic Release 2000, chapter: "Catalysis and Catalysts", pages 28-32] and by Ertl et al. [Ertl, Knözinger, Weitkamp, Handbook of Heterogeneous Catalysis, VCH Weinheim, 1997, pages 98 ff].

Standard processes for shaping are, for example, extrusion, tableting, i.e. mechanical pressing, or pelletizing, i.e. compaction by circular and/or rotating movements.

The shaping operation can give shaped bodies with the abovementioned geometry.

The conditioning or shaping is generally followed by a heat treatment. The temperatures in the heat treatment typically correspond to the temperatures in the calcination.

Precipitative Application

In a further preferred embodiment, the shaped bodies can be produced by precipitative application.

Precipitative application is understood to mean a production method in which a sparingly soluble or insoluble support material is suspended in a liquid and then soluble compounds, such as soluble metal salts, of the corresponding metal oxides are added, and these are then applied by precipitation to the suspended support by addition of a precipitant (for example, described in EP-A2-1 106 600, page 4, and A. B. Stiles, Catalyst Manufacture, Marcel Dekker, Inc., 1983, page 15).

Useful sparingly soluble or insoluble support materials include, for example, carbon compounds such as graphite, carbon black and/or activated carbon, aluminum oxide (gamma, delta, theta, alpha, kappa, chi or mixtures thereof), silicon dioxide, zirconium dioxide, zeolites, alumosilicates or mixtures thereof.

The support material is generally in the form of powder or spall.

The liquid used, in which the support material is suspended, is typically water.

Useful soluble compounds include the aforementioned soluble compounds of the active components or of the doping elements.

The precipitation reactions can be performed, for example, at temperatures of 20 to 100° C., particularly 30 to 90° C., especially at 50 to 70° C.

The precipitates obtained in the precipitation reactions are generally chemically inhomogeneous and generally comprise mixtures of the oxides, oxide hydrates, hydroxides, carbonates and/or hydrogencarbonates of the metals used. It may be found to be favorable for the filterability of the precipitates if they are aged, i.e. if they are left alone for a certain time after the precipitation, optionally while heating or while passing air through.

The precipitates obtained by these precipitation processes are typically processed, by washing, drying, calcining and conditioning them.

After washing, the precipitates are generally dried at 80 to 200° C., preferably 100 to 150° C., and then calcined.

The calcination is executed generally at temperatures between 300 and 800° C., preferably 350 to 600° C., especially at 450 to 550° C.

After the calcination, the pulverulent catalyst precursors obtained by precipitation reactions are typically conditioned.

The conditioning can be effected, for example, by adjusting the precipitation catalyst to a particular particle size by grinding.

After grinding, the catalyst precursor obtained by precipitation reactions can be mixed with shaping assistants such as graphite or stearic acid and processed further to give shaped bodies.

Standard processes for shaping are described, for example, in Ullmann [Ullmann's Encyclopedia Electronic Release 2000, chapter: "Catalysis and Catalysts", pages 28-32] and by Ertl et al. [Ertl, Knözinger, Weitkamp, Handbook of Heterogeneous Catalysis, VCH Weinheim, 1997, pages 98 ff].

Standard processes for shaping are, for example, extrusion, tableting, i.e. mechanical pressing, or pelletizing, i.e. compaction by circular and/or rotating movements.

The shaping operation can give shaped bodies with the abovementioned geometry.

The conditioning or shaping is generally followed by a heat treatment. The temperatures in the heat treatment typically correspond to the temperatures in the calcination.

Reduction

Shaped bodies which have been produced by impregnation or precipitation (precipitative application or coprecipitation) generally comprise the catalytically active components, after calcination, generally in the form of the oxygen compounds thereof, for example the metal oxides or hydroxides thereof, such as CoO, NiO, CuO and/or the mixed oxides thereof (catalyst precursors).

The catalyst precursors which have been prepared as described above by impregnation or precipitation (precipitative application or coprecipitation) are generally reduced after the calcination or conditioning. The reduction generally converts the catalyst precursor to the catalytically active form thereof.

The reduction of the catalyst precursor can be performed at elevated temperature in an agitated or unagitated reduction furnace.

The reducing agent used is typically hydrogen or a hydrogen-comprising gas.

The hydrogen is generally used in technical grade purity. The hydrogen can also be used in the form of a hydrogen-comprising gas, i.e. in mixtures with other inert gases, such as nitrogen, helium, neon, argon or carbon dioxide. The hydrogen stream can also be recycled in the reduction as cycle gas, optionally mixed with fresh hydrogen and optionally after removal of water by condensation.

The catalyst precursor is preferably reduced in a reactor in which the shaped bodies are arranged as a fixed bed. Particular preference is given to reducing the catalyst in the same reactor in which the subsequent conversion is effected.

In addition, the catalyst precursor can be reduced in a fluidized bed reactor in the fluidized bed.

The catalyst precursor is generally reduced at reduction temperatures of 50 to 600° C., especially from 100 to 500° C., more preferably from 150 to 450° C. The partial hydrogen pressure is generally from 1 to 300 bar, especially from 1 to 200 bar, more preferably from 1 to 100 bar, the pressure figures here and hereinafter relating to the pressure measured in absolute terms. The duration of the reduction is preferably 1 to 20 hours, and more preferably 5 to 15 hours.

During the reduction, a solvent can be supplied in order to remove water of reaction formed and/or in order, for example, to be able to heat the reactor more quickly and/or to be able to better remove the heat during the reduction. The solvent here may also be supplied in supercritical form.

Suitable solvents used may be the above-described solvents. Preferred solvents are water; ethers such as methyl tert-butyl ether, ethyl tert-butyl ether, dioxane or tetrahydrofuran. Particular preference is given to water or tetrahydrofuran. Suitable solvents likewise include suitable mixtures.

The shaped body thus obtained, after reduction, can be handled under inert conditions. The shaped body can preferably be handled and stored under an inert gas such as nitrogen, or under an inert liquid, for example an alcohol, water or the product of the particular reaction for which the catalyst is used. In that case, it may be necessary to free the catalyst of the inert liquid prior to commencement of the actual reaction.

Storage of the catalyst under inert substances enables uncomplicated and nonhazardous handling and storage of the shaped body.

After reduction, the shaped body can also be contacted with an oxygen-comprising gas stream such as air or a mixture of air with nitrogen.

Thus a passivated shaped body is obtained. The passivated shaped body generally has a protective oxide layer. This protective oxide layer simplifies the handling and storage of the catalyst, such that, for example, the installation of the passivated shaped body into the reactor is simplified. A passivated shaped body is preferably reduced as described above by treatment of the passivated catalyst with hydrogen or a hydrogen-comprising gas prior to contacting with the reactants. The reduction conditions generally correspond to the reduction conditions which are employed in the course of reduction of the catalyst precursors. The activation generally removes the protective passivation layer.

Gas

In a particularly preferred embodiment, a gas is supplied to the reactor in which the conversion of the diamines is effected.

Particular preference is given to supplying the gas by introducing it into the liquid phase of the reactor.

The gas supplied is more preferably an inert gas or hydrogen or a mixture of inert gas and hydrogen.

Inert gases refer hereinafter to gases which are predominantly inert under the present reaction conditions and essentially do not react with the diamines present in the reaction mixture or the polyamines formed. The inert gases used are preferably nitrogen or noble gases, especially helium, neon, argon or xenon. Very particular preference is given to supplying nitrogen. The inert gases used may also be mixtures of the aforementioned gases.

Hydrogen

In a particularly preferred embodiment, hydrogen is supplied as a gas.

The hydrogen is generally used in technical grade purity. The hydrogen can also be used in the form of a hydrogen-comprising gas, i.e. with additions of other inert gases, such as nitrogen, helium, neon, argon or carbon dioxide. The hydrogen-comprising gases used may, for example, be reformer offgases, refinery gases etc., if and as long as these gases do not comprise any catalyst poisons for the catalysts used, for example CO. Preference is given, however, to using pure hydrogen or essentially pure hydrogen in the process, for example hydrogen having a content of more than 99% by weight of hydrogen, preferably more than 99.9% by weight of hydrogen, more preferably more than 99.99% by weight of hydrogen, especially more than 99.999% by weight of hydrogen.

If the conversion is effected in the presence of hydrogen, high conversions and reaction rates and/or degrees of polymerization can be achieved. In addition, the polyamines obtained have a relatively low degree of color.

In a particularly preferred embodiment, the gas supplied comprises at least 50 mol % of hydrogen, more preferably at least 75 mol % of hydrogen and most preferably at least 99 mol % of hydrogen.

In a very particularly preferred embodiment, the gas supplied consists of hydrogen.

Solvent

The inventive conversion can be performed in substance or in a liquid as a solvent.

Suitable liquids are, for example, liquids which are very substantially inert under the conditions of the conversion.

Preferred liquids are C4 to C12 dialkyl ethers such as diethyl ether, diisopropyl ether, dibutyl ether or tert-butyl methyl ether, or cyclic C4 to C12 ethers such as tetrahydrofuran, 2-methyltetrahydrofuran, 3-methyltetrahydrofuran or dioxane, dimethoxyethane, diethylene glycol dimethyl ether, or hydrocarbons such as pentane, hexane, heptane, 2,2,4-trimethylpentane, octane, cyclohexane, cyclooctane, methylcyclohexane, xylene, toluene or ethylbenzene, or amides such as formamide, dimethylformamide or N-methylpyrrolidone. Suitable liquids may also be mixtures of the aforementioned liquids.

Preference is given to performing the inventive conversion in bulk without solvent.

If a solvent is used, the concentration of monomers used at the start of the conversion is generally in the range from 0.1 to 50% by weight, preferably 1 to 40% by weight, more preferably 2 to 30% by weight and most preferably 5 to 25% by weight.

Reactor

The preparation of the polyamines in the presence of catalysts can preferably be performed in customary reaction vessels suitable for catalysis, in fixed bed or suspension mode continuously, semicontinuously or batchwise.

Suspension

In a particularly preferred embodiment, the catalyst is suspended in the reaction mixture to be polymerized.

Polymerization in suspension mode can preferably be performed in a stirred reactor, jet loop reactor, jet nozzle reactor, bubble column reactor, or in a cascade of such identical or different reactors.

Particular preference is given to performing the polymerization in suspension mode in a stirred reactor.

The settling speed of the catalyst in liquid diamines or the selected solvent should be low in order that the catalyst can be kept efficiently in suspension.

The particle size of the catalysts used in suspension mode is therefore preferably between 0.1 and 500 µm, especially 1 and 100 µm.

Fixed Bed

In a particularly preferred embodiment, the polymerization is performed in a reactor in which the catalyst is arranged as a fixed bed.

Suitable fixed bed reactors are described, for example, in the article "Catalytic Fixed-Bed Reactors" (Ullmann's Encyclopedia of Industrial Chemistry, Published Online: 15 JUN 2000, DIO: 10.1002/14356007.b04_199).

Preference is given to performing the process in a shaft reactor, shell and tube reactor or tubular reactor.

Particular preference is given to performing the process in a tubular reactor.

The reactors can each be used as a single reactor, or they can be used as a series of individual reactors and/or in the form of two or more parallel reactors.

In a preferred embodiment, the fixed bed arrangement comprises a catalyst bed in the actual sense, i.e. loose, supported or unsupported shaped bodies which are preferably present in the above-described geometry or shape.

For this purpose, the shaped bodies are introduced into the reactor.

In order that the shaped bodies remain in the reactor and do not fall through it, a grid base or a gas- and liquid-pervious sheet is typically used, on which the shaped bodies rest.

The shaped bodies may be surrounded by an inert material either at the inlet or at the outlet of the reactor. The inert materials used are generally shaped bodies which have a similar geometry to the above-described shaped catalyst bodies but are inert in the reactor, for example Pall rings, spheres of an inert material (e.g. ceramic, steatite, aluminum).

However, the shaped bodies can also be mixed with inert material and be introduced into the reactor as a mixture.

The catalyst bed (shaped bodies+optionally inert material) preferably has a bulk density (to EN ISO 6) in the range from 0.1 to 3 kg/l, preferably from 1.5 to 2.5 kg/l and especially preferably 1.7 to 2.3 kg/l.

Process Parameters

The catalyst hourly space velocity in continuous mode is typically 0.1 to 1.5 kg, preferably from 0.3 to 1.2 and more preferably from 0.4 to 1.0 kg of reactant per l of catalyst and hour.

The residence time in batchwise or semicontinuous mode is typically 0.5 to 3, preferably 0.5 to 2.5 and more preferably 0.5 to 1.5 hours.

The conversion is performed preferably at temperatures in the range from 50 to 200° C., more preferably 90 to 190° C. and most preferably 130 to 170° C.

In a preferred embodiment, the temperature in the reactor is 165° C. or less, preferably 50 to 165° C., more preferably 90 to 165° C. and most preferably 130 to 165° C. Within this temperature range, selectivity is high (less deamination and fewer side reactions).

The conversion is preferably performed at a pressure at which the monomers and dimers are very substantially in the liquid state at reaction temperature. The conversion is effected preferably at a pressure in the range from 1 to 400 bar, more preferably 1 to 200 bar and most preferably 1 to 70 bar.

If the reaction is performed in the presence of hydrogen, the partial hydrogen pressure is preferably from 1 to 400 bar, especially from 1 to 200 bar, more preferably from 1 to 70 bar.

The performance of the reaction within the aforementioned pressure and temperature ranges enables the preparation of polyamines with good space-time yields and high selectivity (e.g. little deamination) within the molecular range intended.

Supply of the Monomers

In a batchwise process, the diamines are preferably initially charged in the reactor. For this purpose, the diamines can be conveyed into the reactor with suitable conveying apparatus, for example liquid pumps, vacuum conveyors or pneumatic conveyors. Suitable apparatuses for filling a reactor, depending on the state of matter of the substance to be conveyed, are known to those skilled in the art.

The diamines are preferably conveyed into the reactor in the liquid state. For this purpose, it may be necessary to heat the diamines to a temperature above the melting point or solidification point thereof and/or to work under a pressure at which the diamines are in the liquid state. In addition, it may be preferable to dissolve the diamines in one of the aforementioned solvents.

In a continuous reactor, the diamines are preferably pumped into the reactor in the liquid state. The flow of the feedstocks in the reactor may be from the top downward (trickle mode) or from the bottom upward (liquid phase mode).

Gas Supply

The amount of gas supplied is preferably in the range from 1 to 1000 liters of gas per hour per liter of free reactor volume, more preferably 5 to 500, even more preferably 10 to 300 and especially preferably 50 to 200 liters of gas per hour per liter of free reactor volume, the free reactor volume as the difference between the empty reactor volume and the volume of the catalyst charge (including the internals). The free reactor volume corresponds to the volume of a liquid which is required to completely fill the catalyst-charged reactor (including all internals).

If the gas supply rate is within the aforementioned range, both a high polymerization rate and high molecular weight can be achieved.

The supply of the gas is preferably continuous, i.e. essentially without interruption.

However, the supply can also be periodic or aperiodic with periodic or aperiodic interruptions, in which case it is advantageous that the average interruptions are shorter than the average supply phases. Preferably, the average interruptions are shorter than 15 minutes, preferably shorter than 2 minutes and more preferably shorter than 1 minute.

Preferably, the supply of the gas is homogeneous over the duration of the conversion, i.e. is without any great variations with time. In a batchwise or semibatchwise process, the supply flow rate of gas can increase with increasing reaction time, although the upper limit of the preferred range should preferably not be exceeded. Thus, the amount of monomers which may be entrained out of the reactor with the gas is reduced.

Most preferably, the gas supply is continuous, i.e. essentially without interruption.

In a batchwise process, the supply of the gas is preferably separate from the supply of the diamines.

In a batchwise process, the supply of the gas may be simultaneous together with the diamines via one or more separate inlets.

Gas Dispersion

In a very particularly preferred embodiment, the gas supplied is dispersed in the liquid phase.

Dispersion is understood to mean the fine and very substantially homogeneous distribution of the gas in the liquid phase.

In a preferred embodiment, dispersion of the gas in the liquid phase can be achieved by passing the gas into the reactor through suitable entry orifices.

In a further preferred embodiment, dispersion of the gas in the liquid phase can be achieved by the action of flow-generated shear stress on the gas supplied, which causes sufficient deformation in the gas supplied against the stabilizing effect of interfacial tension, such that the gas stream is divided into bubbles. The energy input for generation of shear stress which acts on the gas or gas bubbles can be effected, for example, through the input of energy into the dispersion medium, for example by the generation of a flow into the dispersion medium, i.e. the liquid phase. Preference is given to generation of a turbulent flow. A flow can, as described below, be effected, for example, by stirring or circulation of the liquid phase.

The greatest coherent gas volume in the liquid phase should preferably not exceed a maximum of 1%, better 0.1%, of the stirred tank volume (above the liquid phase, in the upper region of the reactor, a greater gas volume may be present). It is preferable that the diameter of the gas bubbles, and hence the greatest coherent gas space in the liquid phase, is in the range from diameter 0.1 mm to 100 mm, more preferably in the range from 0.5 to 50 mm and most preferably in the range from 1 to 10 mm.

The dispersion of the gas in the liquid phase has the advantage that the ammonia formed in the conversion of the diamines to polyamine can be converted to the gas phase and removed from the reactor. By removal of the ammonia formed together with the gas supplied, it is possible to achieve polyamines having a high molecular weight and a low degree of branching.

Entry Orifices

In a preferred embodiment, the gas is introduced through one or more entry orifices.

Preferred entry orifices are a gas inlet tube, a distributor ring or a nozzle. The term "nozzle" typically refers to a pipe which narrows in flow direction.

In order to achieve homogenization of the distribution of the gas-liquid phase mixture, it is additionally preferable to use distributor apparatus, for example sintered or perforated plates in the region of the feed orifices. The perforated plates or sintered trays may be distributed over the entire cross section or part of the cross-sectional area of the reactor.

Most preferably, the distribution of the gas in the liquid is improved by distributing the entry orifices homogeneously over the cross section of the reactor, as, for example, in the case of a distributor ring.

Fixed Bed Reactor

In a fixed bed reactor having essentially plug flow characteristics, the gas is dispersed in the liquid phase preferably by means of entry orifices.

In order to achieve homogenization of the distribution of the gas-liquid phase mixture and in order to avoid the problems described, it is preferable to use distributor devices, for example sintered or perforated plates, in the region of the supply orifices. The perforated plates or sintered trays may be distributed over the entire cross section or part of the cross-sectional area of the reactor.

In a further preferred embodiment, the gas is supplied via entry orifices which are distributed very substantially homogeneously over the cross section of the reactor, as, for example, in the case of a distributor ring. It is additionally preferable to pass the gas into the reactor through perforated plates or sintered trays with substantially homogeneously distributed passage orifices.

In a particularly preferred embodiment, apart from the hydraulic flow induced by introduction of the liquid and of the gas, no additional flow is generated in the reactor, for example by stirring or pumped circulation of the liquid phase.

This embodiment has the advantage that the characteristic plug flow of the reactor is not significantly disrupted and backmixing is restricted. This has the advantage that polyamines having a relatively narrow molar mass distribution and a relatively low proportion of monomers can be prepared.

In a very particularly preferred embodiment, the gas is supplied in the manner of the distributor device for a gas-liquid phase mixture described in DE102005050283, to which explicit reference is made, and in which a gas phase and a liquid phase are passed through at least one supply orifice to the interior of the apparatus, and wherein the distributor device comprises a horizontal plate at which the ascending gas phase backs up to form a gas cushion and vertical elements which conduct the liquid phase and are arranged on the plate and are open in the upstream direction and project outward in the direction of the feed opening through the gas cushion formed into the liquid phase, with at least one opening for the gas phase being provided on the circumference of the elements which conduct the liquid phase in the region of the gas cushion formed.

Suspension Reactor

If the reaction is performed in suspension mode, the dispersion can be improved by generating a flow, preferably a turbulent flow, in the region of the gas supply. The flow-generated shear stress generally causes sufficient deformation in the gas supplied against the stabilizing effect of the interfacial tension, such that the gas stream is divided into bubbles. The energy input for generation of shear stress which acts on the gas or gas bubbles can be effected, for example, by the input of energy into the dispersion medium, for example by the generation of a flow in the dispersion medium, i.e. the liquid phase. Preferably, a turbulent flow is generated. A flow can, as described below, be effected, for example, by stirring or circulation of the liquid phase.

In a particularly preferred embodiment, the turbulent flow can be generated by introducing the gas to be dispersed into the reactor at sufficiently high pressure or with sufficiently high velocity. Most preferably, the velocity of the gas supplied is higher than the flow velocity of the dispersion medium. The gas supplied can, as described above, be introduced into the reactor through a gas inlet tube, a distributor ring or a nozzle. A high flow velocity can be achieved by passing the gas into the reactor with sufficiently high pressure. The velocity of the exiting gas can also be regulated through the size of the exit orifice of the gas inlet to the dispersion medium.

For example, the flow velocity of the gas supplied can be increased by a reduction in the diameter of the outlet orifices. However, if the size of the exit orifices selected is too small, the exit orifices can become blocked. The diameter of the exit orifices is preferably in the range from 0.1 to 50 mm, more preferably 1 to 20 mm and most preferably 2 to 10 mm. Especially preferably, the gas supplied should be introduced in countercurrent to the flowing liquid.

In a further particularly preferred embodiment, the turbulent flow can be generated by circulating the dispersion medium through the reactor at sufficiently high velocity. The circulation of the dispersion medium through the reactor can be achieved either by supplying the gas supplied to the reactor with sufficiently high velocity and/or by pumping the dispersion medium itself through the reactor.

If the gas supplied is supplied to the reactor at sufficiently high velocity, the dispersion medium in the reactor is also circulated via transmission of momentum.

Preferably, the dispersion medium is supplied to the reactor by means of a nozzle.

Most preferably, the reactor is equipped with appropriate internals or baffles which disrupt laminar flow in such a way as to result in turbulent flow. The catalyst packing can preferably also function as baffles.

In addition, the reactor may be provided with deflected plates to increase circulation within the reactor.

In a further preferred embodiment, the conversion is effected in a tubular reactor and the turbulent flow in the dispersion medium is generated by stirring.

Useful mixing units include stirrers with different stirrer geometries, for example disk stirrers, impeller stirrers, pitched blade stirrers, gate stirrers, Mig stirrers or propeller stirrers. The feed point for the gas introduced, for example the gas inlet tube, the distributor ring or the nozzle, is preferably below the stirrer, such that the ascending gas bubbles are broken up by the stirrer and distributed very substantially homogeneously in the dispersion medium.

If the supply of the gas is separate from the supply of the liquid, it is preferable that the gas is supplied to the region of the reactor in which the turbulent flow is generated.

In the case of a stirred tank reactor, it is preferable to supply the gas below the stirrer via a gas inlet tube, a gas distributor ring or a nozzle, such that the gas stream is broken up by the energy input of the stirrer into smaller bubbles which are distributed homogeneously in the reaction volume.

Discharge

In a preferred embodiment, the gas supplied is removed from the reactor together with ammonia which is formed in the conversion of the diamines to polyamine.

The removal of ammonia from the reactor has the advantage that high degrees of polymerization and a good space-time yield can be achieved.

The gas supplied and the ammonia formed in the conversion can be removed from the reactor essentially separately or together with the liquid phase.

Separate Discharge of the Gas Stream

In a preferred embodiment, the gas and the ammonia are removed from the reactor essentially separately from the liquid phase.

The gas supplied is preferably discharged from the reactor at a gas outlet together with the ammonia formed. The gas outlet is preferably a valve, since the conversion of the diamines is preferably performed at relatively high pressure. The gas outlet, however, may also be a simple orifice, for example a pipeline. If the gas supplied is to be discharged together with the ammonia formed and separately from the liquid phase, it is possible to take measures such that the liquid phase is not discharged from the reactor together with the gas. For this purpose, the gas outlet may be positioned in the upper region of the reactor in the gas space above the level of the liquid phase. However, it is also possible to provide a membrane, a sintered plate or a frit pervious only to the gas phase in front of the gas outlet in order to retain the liquid phase in the reactor.

The gas stream removed from the reactor can suitably be disposed of or worked up.

In a particularly preferred embodiment, the gas stream removed from the reactor is recycled back into the reactor.

This has the advantage that the material input costs can be reduced.

In a very particularly preferred embodiment, ammonia is removed from the gas stream prior to the recycling thereof.

This is preferably done by condensing ammonia out of the gas stream, so as to obtain a gas stream essentially free of ammonia, and to obtain a liquid stream comprising ammonia.

It is additionally preferable to remove any entrained diamine or oligomers of the diamine from the gas stream prior to the recycling thereof.

In a very particularly preferred embodiment, entrained diamine or oligomers of the diamine are first removed from the gas stream, followed by the removal of ammonia from the gas stream.

For removal of any entrained amounts of liquid, for example diamines, oligomers of diamine and/or solvents, the discharged gas is introduced into a phase separator or liquid separator. In the phase separator, the entrained liquid phase is separated from the gas phase comprising ammonia and gas supplied.

The liquid phase which has been separated out in the phase separator and consists essentially of unconverted monomers or lower oligomers can preferably be recycled into the reactor or used in a subsequent reaction. This has the advantage that yield losses, based on the diamine used, can be reduced. It is preferable that the recycled stream composed of diamine, oligomers of the diamine and possibly solvents is essentially free of ammonia. This is generally already achieved downstream of the liquid remover. Should the recycled stream nevertheless comprise ammonia, ammonia can be removed from the liquid phase separated out in the phase separator, for example by distillation or degassing (stripping).

The removal of ammonia from the discharged gas stream can preferably be effected by cooling the gas stream by means of a cooling apparatus to a temperature at which ammonia is converted to the liquid state, and the gas supplied remains in the gas phase. The cooling apparatus is preferably a condenser.

In general, ammonia is condensed out of the gas stream, so as to obtain a gas stream essentially free of ammonia, and to obtain a liquid stream comprising ammonia, and the gas which has been removed from ammonia can optionally be recycled into the reactor.

The condenser may be configured from virtually all condensers known to those skilled in the art, for example plate condenser, shell and tube condenser or coil condenser. The condenser is preferably configured as a shell and tube condenser. The condenser may be operated horizontally or vertically; the condensation may take place in the shell space or in the tubes.

Downstream of the cooling apparatus, the gas stream generally comprises only the gas supplied, since the ammonia present in the gas stream has been condensed out.

The uncondensed gas stream is preferably recycled into the reactor. It is preferable that the stream recycled comprises essentially no ammonia. This is generally already achieved downstream of the cooling apparatus. Should the ammonia content nevertheless be higher, the gas stream can be cooled again, for example at lower temperatures.

In a less preferred embodiment, ammonia is first removed from the gas stream together with the entrained liquid phase, by cooling the gas stream such that ammonia is liquefied, and the liquid phase is separated from the gas phase.

The removal of ammonia from the gas stream discharged can in that case preferably be effected by cooling the gas stream by means of a cooling apparatus to a temperature at which ammonia is converted to the liquid state, and the gas supplied remains in the gas phase. The cooling apparatus is preferably a condenser.

The condenser may be configured from virtually all condensers known to those skilled in the art, for example plate condenser, shell and tube condenser or coil condenser. The condenser is preferably configured as a shell and tube condenser. The condenser may be operated horizontally or vertically; the condensation may take place in the shell space or in the tubes.

The liquid phase removed comprises, as well as ammonia, possibly also entrained amounts of diamine, oligomers of diamine and possibly solvents.

Preferably, ammonia is removed from the liquid phase diamine or oligomers of the diamine, for example by distillation, degassing (stripping) or vaporization of the ammonia. The liquid phase which remains after the removal of the ammonia can be recycled into the reactor or used in a subsequent conversion. The liquid phase composed of diamine, oligomers of diamine and possibly solvents, which is recycled or reused, is preferably essentially free of ammonia.

The uncondensed gas phase comprising inert gas and/or hydrogen can be discharged from the reactor or preferably recycled into the reactor.

Discharge Together with Reaction Output

In a further particularly preferred embodiment, the gas supplied and the ammonia formed are discharged from the reactor together with a portion of the liquid phase.

This mode of operation is preferred in continuous mode especially in the case of use of a fixed bed reactor.

Preferably, the liquid phase is discharged from the reactor through a liquid outlet together with the gas dispersed in the liquid phase and the ammonia formed. The liquid outlet is generally a pipeline with a valve at the end thereof.

If the catalyst is used not in the form of a fixed bed but in the form of a suspension, it is preferable to separate the catalyst from the reactor output prior to further workup. For this purpose, the reactor output can, for example, be filtered. In the case of a continuous process, the catalyst can be effected, for example, by crossflow filtration. The catalyst can also be removed from the reactor by centrifugation or sedimentation.

Flash Evaporation

It is additionally preferable that the reactor output is decompressed at the reactor outlet, such that ammonia which is still present in the liquid phase and is still in the liquid state is very substantially converted to the gas phase.

For this purpose, the reactor output is generally transferred through a valve into a space with pressure lower than that existing in the reactor, but at which unconverted diamine monomer still remains in the liquid phase. Preferably, the reduced pressure in the vessel in which the reaction output is decompressed is about 10 to 50% lower than the pressure in the reactor.

Preferably, the gas phase comprising ammonia and the gas supplied is separated from the liquid phase comprising polyamine, oligomers of the diamine and diamine, and possibly solvents. The liquid phase is preferably, as described below, recycled into the reactor. It is preferable that the liquid phase recycled, comprising diamine, oligomers of the diamine and possibly solvents, is essentially free of ammonia. This is generally already achieved after the flash evaporation. Should the ammonia content nevertheless be higher, ammonia can be removed from the liquid phase separated out in the phase separator, for example by distillation or degassing (stripping).

The fraction of the components still in gaseous form after the flash evaporation is preferably partially condensed in a condenser, the condensation preferably being operated such that ammonia is essentially fully condensed. The gas supplied, for example inert gas and/or hydrogen, is preferably not condensed. Ammonia is preferably discharged from the process.

The uncondensed gas, which consists essentially of inert gas and/or hydrogen, is preferably recycled into the process. The gas recycled preferably comprises essentially no ammonia.

Workup—Column K1

In a very particularly preferred embodiment, the reaction output is decompressed into a distillation column.

The column is generally operated such that ammonia and gas supplied are drawn off at the top of the column and the rest of the liquid phase (monomer, oligomers and polymers) is drawn off at the bottom of the column (variant 1).

However, column K1 can also be operated in such a way that ammonia and the gas supplied are drawn off at the top, monomeric and oligomeric diamine are drawn off from a side draw in the middle region of the column, and higher molecular weight polyamine is drawn off at the bottom of the column (variant 2).

The exact operating conditions of the distillation column can, in accordance with the separation performance of the column used, be determined in a routine manner by the person skilled in the art by customary calculation methods using the known vapor pressures and evaporation equilibria of the components introduced into the distillation column.

Variant 1

The reactor output is preferably decompressed into the middle region of a distillation column K1.

The distillation column K1 is more preferably executed in a tray column. In a tray column, intermediate trays on which the mass transfer takes place are present within the column. Examples of different tray types are sieve trays, tunnel-cap trays, dual-flow trays, bubble-cap trays or valve trays.

In a further preferred embodiment, the distillative internals may be present as an ordered packing, for example as a sheet metal packing, such as Mellapak 250Y or Montz Pak, B1-250 type, or as a structured ceramic packing or as an unordered packing, for example composed of Pall rings, IMTP rings (from Koch-Glitsch), Raschig Superrings, etc.

At the top of column K1, a gaseous stream composed of the gas supplied and ammonia is generally obtained.

In a particularly preferred embodiment, ammonia is separated from the gas stream obtained at the top. The separation of ammonia from the gas stream discharged can preferably be effected by cooling the gas stream by means of a cooling apparatus to a temperature at which ammonia is converted to the liquid state, and the gas supplied remains in the gas phase. The cooling apparatus is preferably a condenser.

The condenser of the distillation column K1 is generally operated at a temperature at which the ammonia is very substantially condensed at the corresponding top pressure.

The condensed ammonia is preferably discharged from the process.

The uncondensed gas, which consists essentially of inert gas and/or hydrogen, is preferably recycled into the process. The recycled gas is preferably essentially free of ammonia.

Column K1 generally does not require any additional evaporator at the bottom of the column, since the difference between the boiling points of ammonia and monomeric diamine is generally sufficiently high that good separation of ammonia and monomeric diamine is possible without additional heating at the bottom.

However, it is also possible to heat the bottom of the column, for example with a reboiler.

In that case, the temperature at the bottom of the column should be adjusted such that ammonia is very substantially evaporated at the top pressure existing in the column, while monomeric diamine remains in the liquid phase.

The bottoms output from column K1 comprises essentially diamine, oligomers of the diamine, polyamine and possibly solvents.

A portion of the bottoms output can be a) recycled to the reactor, or
b) introduced into a further column K2 in which monomeric diamine and low-boiling oligomer are separated from higher-boiling polyamine, or
c) withdrawn from the reactor as reaction product.

a) A portion of the bottoms output from column K1 can be recycled into the reactor, where further condensation takes place. Thus, polymers having a particularly high molecular weight can be achieved.

It is preferable that the bottoms output recycled comprises essentially no ammonia. This is generally already achieved after the flash evaporation (distillation). Should the ammonia contents nevertheless be higher, the ammonia content can be reduced, for example by distillation or degassing (stripping).

b) The bottoms output from column K1 can be introduced into a further distillation column K2, which is operated in such a way that monomeric diamine and low-boiling oligopolyamine are obtained at the top of the column, and polyamine is drawn off at the bottom of the column. Column K2 is described in detail below.

c) A portion of the bottom product from column K1 can be discharged from the process as reaction product.

Variant 2

Column K1 can also be operated in such a way that ammonia and the gas supplied are obtained at the top of the column, a fraction comprising monomeric diamine and lower-boiling oligomers is withdrawn as a side draw product in the middle region, and polyamine is obtained at the bottom of column K1.

The reactor output is, as in the above-described variant 1, preferably decompressed into the middle region of a distillation column K1 as described above.

At the top of column K1, a gaseous stream composed of the gas supplied and ammonia is generally obtained.

In a particularly preferred embodiment, ammonia is separated from the gas stream obtained at the top. The separation of ammonia from the gas stream discharged can preferably be effected by cooling the gas stream by means of a cooling apparatus to a temperature at which ammonia is converted to the liquid state, and the gas supplied remains in the gas phase. The cooling apparatus is preferably a condenser.

The condenser of the distillation column K1 is generally operated at a temperature at which the ammonia is very substantially condensed at the corresponding top pressure.

The condensed ammonia is preferably discharged from the process.

The uncondensed gas, which consists essentially of inert gas and/or hydrogen, is preferably recycled into the process.

Column K1 generally does not require any additional evaporator at the bottom of the column, since the difference between the boiling points of ammonia and monomeric diamine is generally sufficiently high that good separation of ammonia and monomeric diamine is possible without additional heating at the bottom.

However, it is also possible to heat the bottom of the column, for example with a reboiler.

In that case, the temperature at the bottom of the column should be adjusted such that ammonia is very substantially evaporated at the top pressure existing in the column, while monomeric diamine remains in the liquid phase.

The side draw product drawn off from column K1 is preferably a fraction comprising essentially oligomers of the diamine and diamine.

The side draw product can be a) discharged from the process, or
b) recycled into the process (preferred variant).

When the side draw product is recycled into the process, it is preferable that the side draw product comprises essentially no ammonia. This is generally already achieved after the flash evaporation (distillation). Should the ammonia contents nevertheless be higher, the ammonia content can be reduced, for example by distillation or degassing (stripping).

The bottoms output of column K1 comprises essentially diamine, oligomers of the diamine, polyamine and possibly solvents.

A portion of the bottoms output can, as described in variant 1, be a) recycled to the reactor, or
b) introduced into a further column K2 in which monomeric diamine and low-boiling oligomer are separated from higher-boiling polyamine, or
c) withdrawn from the reactor as reaction product.

Workup—Column K2

The bottoms output from column K1 can be introduced into a further column K2 which is operated in such a way that monomeric diamine and low-boiling oligomers are obtained at the top of the column and polymeric polyamine at the top of the column. Column K2 can also be operated in such a way that predominantly monomeric diamine can be drawn on at the top, predominantly oligomeric diamine at a side draw and polymeric diamine at the bottom.

The bottoms output from column K1 is preferably supplied to the middle region of a distillation column K2.

Preferably, the distillation column K2 has internals for increasing the separation performance. The distillative internals may be present, for example, as an ordered packing, for example as a sheet metal packing such as Mellapak 250 Y or Montz Pak, B1-250 type. It is also possible for a packing with lower or elevated specific surface area to be present, or it is possible to use a fabric packing or a packing with another geometry such as Mellapak 252 Y. What is advantageous about the use of these distillative internals is the low pressure drop and low specific liquid holdup compared to valve trays, for example. The internals may be present in one or more beds.

The bottom of column K2 is preferably equipped with a reboiler.

The temperature in the bottom of the column should be adjusted such that ammonia monomeric diamine is very substantially evaporated and a portion of the oligomers is evaporated at the top pressure existing in the column, while polymeric polyamine remains in the liquid phase.

At the top of column K2, a gaseous stream comprising essentially of monomer diamine is generally drawn off.

Preferably, the gas stream obtained at the top is fed to a condenser connected to the distillation column K2.

The condenser of distillation column K2 is generally operated at a temperature at which the diamine is very substantially condensed at the corresponding top pressure.

The condensate of column K2, which consists essentially of monomeric diamine, can be discharged or recycled into the process.

The recycled diamine is preferably comprises essentially no ammonia.

This has the advantage that polyamines having high molecular weight and low degrees of branching can be obtained. In addition, the reaction time until attainment of a certain degree of conversion can be reduced (increased reaction rate). Should the ammonia content be relatively high, the diamine can be subjected to a further distillation or degassing operation, for example to a stripping operation.

A portion of the diamine obtained as condensate can be recycled into the column as reflux.

A portion of the bottoms discharge can be recycled to the reactor, or withdrawn from the reactor as reaction product. Preferably, the bottom product of column K2 is discharged as reaction product.

In column K2 it is also possible to withdraw a side draw product comprising a fraction composed of low-boiling oligomers. These oligomers can be discharged, or recycled into the reactor together with the diamine discharged at the top.

Preferred Process Variants

FIGS. 1 to 6 describe particular embodiments of the process according to the invention.

Variant D-1

FIG. 1 shows a batchwise process in which monomer is initially charged in a stirred tank reactor R 1 comprising the catalyst in suspended or fixed form, for example in a metal mesh. Then inert gas and/or hydrogen is passed in continuously. The introduction is preferably effected through a gas inlet tube, a gas distributor ring or a nozzle, which is preferably arranged below a stirrer. The gas stream introduced is broken up into small gas bubbles by the energy input of the stirrer and distributed homogeneously in the reactor. A mixture of ammonia formed and inert gas and/or hydrogen is discharged continuously from the reactor through an outlet orifice in the upper region of the reactor.

If the batchwise polycondensation is performed not in the presence of a fixed catalyst but of a suspended catalyst, the suspension catalyst is first removed, for example by filtration or centrifugation, when the product is discharged in the course of workup of the product of value.

The reaction output obtained in the batchwise polycondensation can be passed into a distillation column K1 in which a stream of diamine and oligomers of the diamine is removed at the top. Polyamine is obtained at the bottom of the column.

The reaction output obtained in the batchwise polycondensation can alternatively be passed into a distillation column K1 in which a stream of diamine is removed at the top and, as a side draw product, a fraction consisting essentially of oligomers of the diamine is removed. At the bottom of the column, polyamine is drawn off.

Variant D-2

Figure 2:
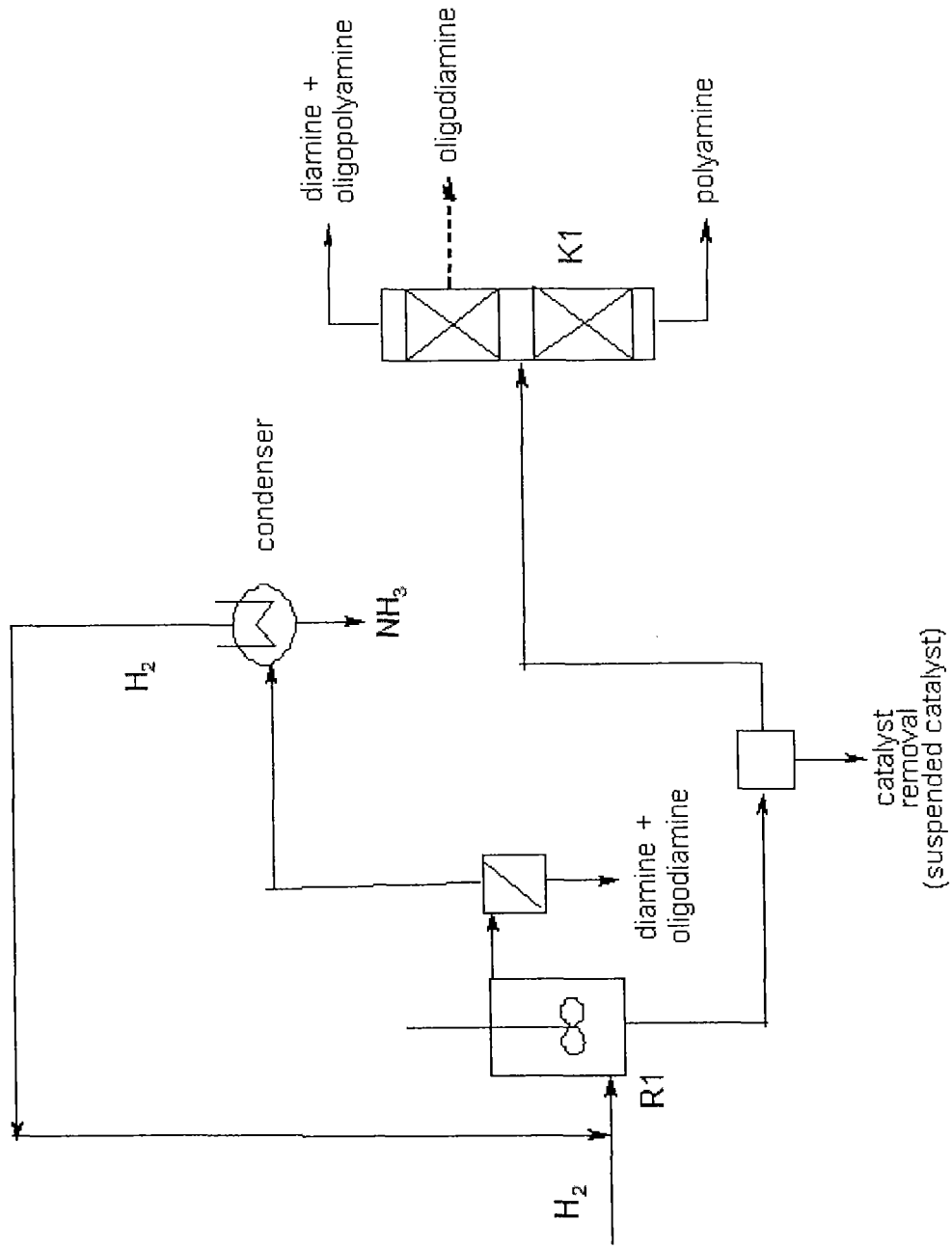
FIG. 2 shows a variant of the process in which the discharged gas stream is decompressed after discharge.

FIG. 2 shows a variant of the process in which the discharged gas stream is decompressed after discharge. For removal of entrained liquid, the gas stream drawn off is introduced into a liquid separator. The liquid separated out in the liquid separator is discharged from the process. Downstream of the liquid separator, the mixture of ammonia and inert gas and/or hydrogen discharged from the reactor is preferably cooled, which liquefies the ammonia, allowing it to be separated from the inert gas and/or hydrogen. The inert gas and/or hydrogen can be compressed again, if necessary admixed with fresh inert gas and/or hydrogen, and recycled into the polymerization stage.

Variant D-3

Figure 3:
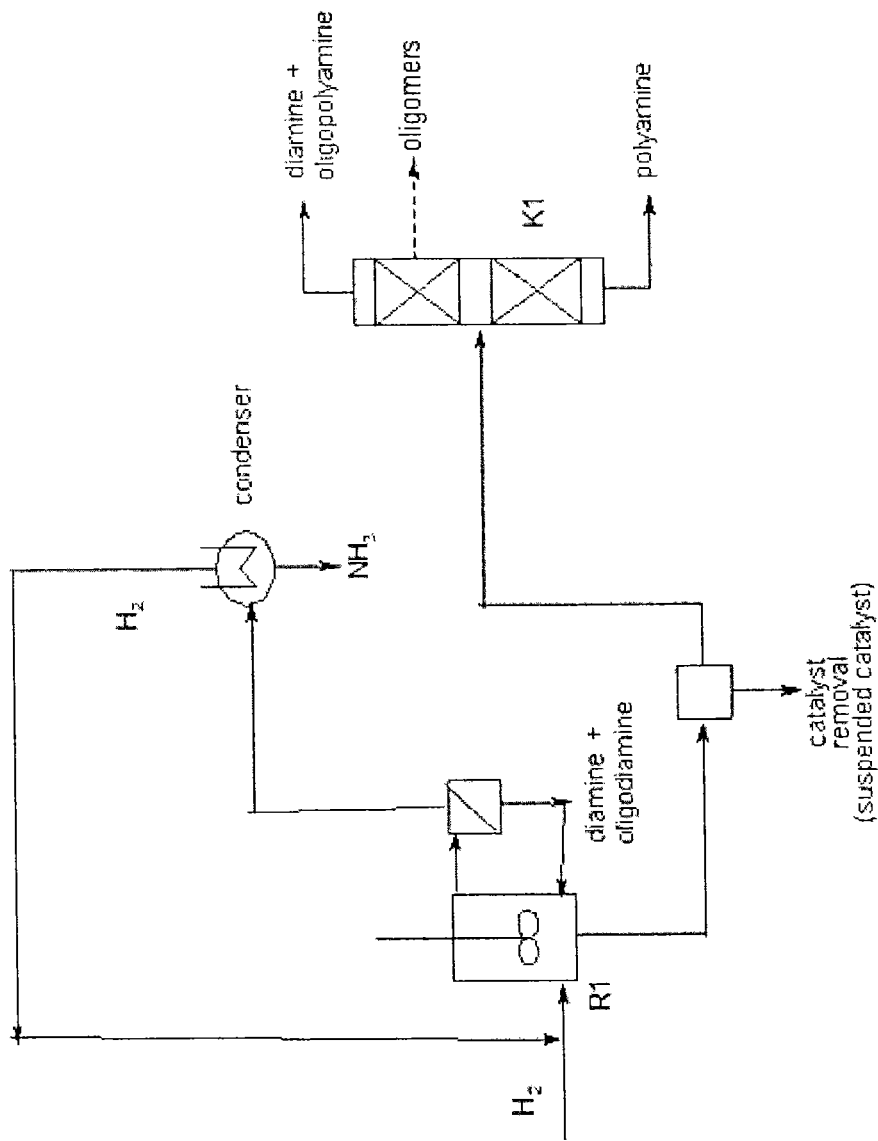
FIG. 3 shows a further variant in which the liquid separated out in the liquid separator, which consists essentially of diamine, oligomers of the diamine and possibly solvents, is recycled into the process.

FIG. 3 shows a further variant in which the liquid separated out in the liquid separator, which consists essentially of diamine, oligomers of the diamine and possibly solvents, is recycled into the process. Should the mixture of diamines and/or oligomers of the diamines comprise by-products, these can be separated, for example by distillation, from the diamines and oligomers thereof prior to the recycling thereof. For instance, in the case of the inventive polycondensation of ethylenediamine, piperazine, for example, can form as a by-product, which can be removed by distillation.

Variant K-1

Figure 4:
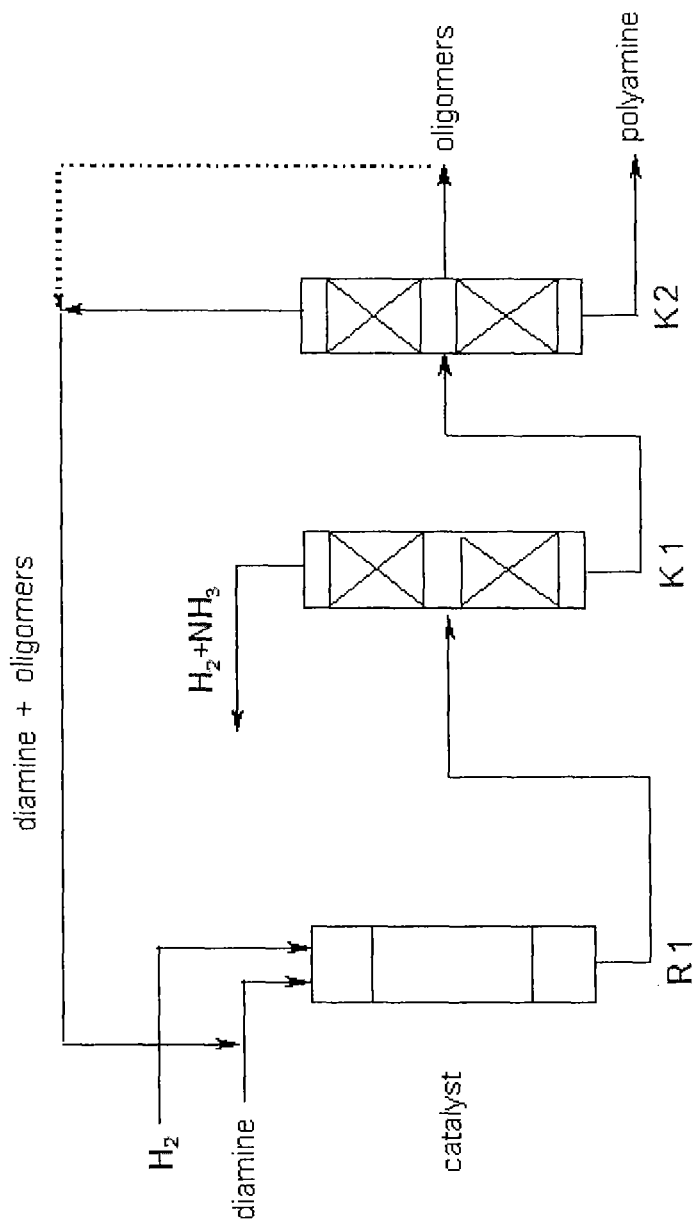
FIG. 4 shows a continuous process for preparing polyamines. Diamine is passed together with inert gas and/or hydrogen over a catalyst arranged in fixed form in an inertized pressure reactor R1.

FIG. 4 shows a continuous process for preparing polyamines. Diamine is passed together with inert gas and/or hydrogen over a catalyst arranged in fixed form in an inertized pressure reactor R1.

The reaction output is passed to column K1. A mixture of ammonia and hydrogen is the overhead product of column K1, and this is discharged from the process.

The bottom product of column K1 is conducted to a column K2. Unconverted diamine is removed as the overhead product of column K2 and recycled into the reactor R1. From a side draw of column K2, oligomers are optionally drawn off, which are discharged and/or recycled into the reactor R1. The bottom product of column K2 comprises polyamine.

Variant K-2

Figure 5:
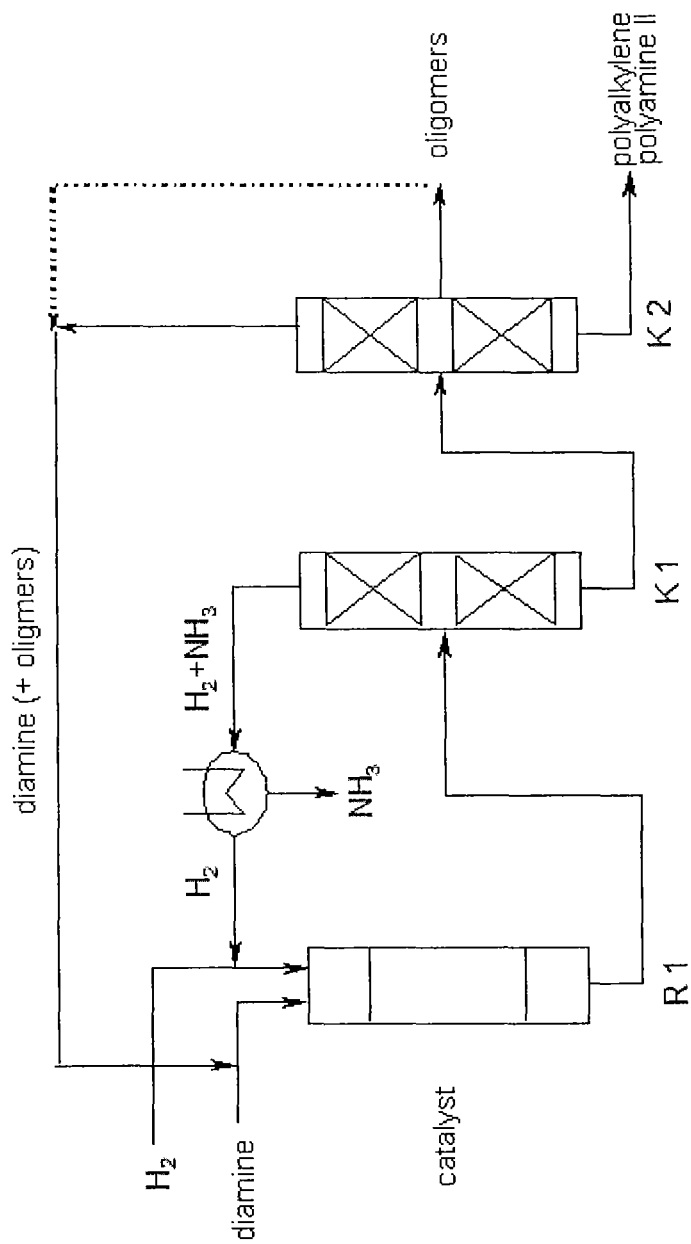
FIG. 5 shows a continuous process for preparing polyamines. Diamine is passed together with inert gas and/or hydrogen over a catalyst arranged in fixed form in an inertized pressure reactor R1.

FIG. 5 shows a continuous process for preparing polyamines. Diamine is passed together with inert gas and/or hydrogen over a catalyst arranged in fixed form in an inertized pressure reactor R1.

The reaction output is passed to a column K1. The overhead product of column K1 is a mixture of ammonia and hydrogen, out of which the ammonia is condensed. Inert gas and/or hydrogen can are recycled into the reactor R1.

The bottom product from column K1 is conducted to a column K2. Via the top of column K2, unconverted diamine and low-boiling oligomer are removed and recycled into the reactor R1. From a side draw of column K2, oligomers are optionally drawn off, which are discharged and/or recycled into the reactor R1. The bottom product of column K2 comprises polyamine.

Variant K-3

Figure 6:
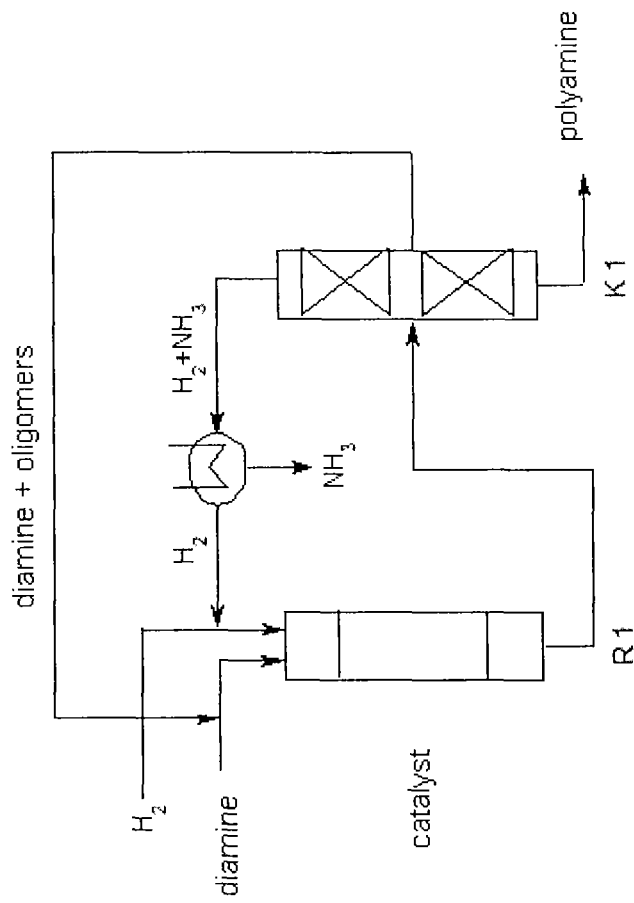
FIG. 6 shows a variant of the continuous process.

FIG. 6 shows a variant of the continuous process.

Diamine is passed together with inert gas and/or hydrogen over a catalyst arranged in fixed form in an inertized pressure reactor R1. Under the reaction conditions, a reaction output is formed, which is passed to a column K1. Column K1 is operated such that the top product obtained is a mixture of ammonia and inert gas and/or hydrogen mixture, a mixture of diamine and oligomers of the diamine is withdrawn from a side draw and polyamine is withdrawn as the bottom product. Column K2 in FIG. 4 or 5 is dispensed with.

Polyamines

By means of the above-described process, it is possible to prepare polyamines (hereinafter also "polymers") having particular properties.

The present invention therefore also relates to homo- and copolymers obtainable by inventive conversion of the above-mentioned diamine monomers.

The polymers can be prepared from repeat units formed from only one kind of diamine monomer (referred to hereinafter as homopolymers). The polymers can also be prepared from mixtures of two or more different kinds of diamine monomer (referred to hereinafter as copolymers).

Preferred polymers are polymers formed from at least one diamine selected from the group consisting of 1,3-propylenediamine, 1,2-propylenediamine, 1,4-butylenediamine, 1,2-butylenediamine, 1,5-diaminopentane, 1,2-diaminopentane, 1,6-diaminohexane, 1,2-diaminohexane, 1,7-diaminoheptane, 1,2-diaminoheptane, 1,8-diaminooctane, 1,2-diaminooctane, 1,9-nonamethylenediamine, 1,10-decamethylenediamine, 1,11-undecamethylenediamine, 1,12-dodecamethylenediamine, 2,2-dimethylpropane-1,3-diamine and 3-(methylamino)propylamine.

Further preferred polymers are polymers formed from at least one diamine selected from the group consisting of N,N-bis(3-aminopropyl)methylamine, N,N'-bis(3-aminopropyl)ethylenediamine, 3-(2-aminoethyl-amino)propylamine, diethylenetriamine (DETA), triethylenetetramine (TETA), tetraethylenepentamine (TEPA), di-1,3-propylenetriamine, tri-1,3-propylenetetramine, tetra-1,3-propylenepentamine, di-1,2-propylenetriamine, tri-1,2-propylenetetramine, tetra-1,2-propylenepentamine, dihexamethylenetriamine, trihexamethylenetetramine and tetrahexamethylenepentamine.

Further preferred polymers are polymers formed from at least one diamine selected from the group consisting of 3,3"-dimethyl-4,4"-diaminodicyclohexylmethane, 4,4"-diaminodicyclohexylmethane, isophoronediamine, 1,3-bis(aminomethyl)cyclohexane, [bis(4-aminocyclohexyl)methane], [bis(4-amino-3,5-dimethylcyclohexyl)methane], [bis(4-amino-3-methylcyclohexyl)methane], 3-(cyclohexylamino)propylamine, piperazine and bis(aminomethyl)piperazines.

Likewise preferred polymers are polymers formed from at least one diamine selected from the group consisting of 4,7,10-trioxatridecane-1,13-diamine, 4,9-dioxadodecane-1,12-diamine and what are called Jeffamines® from Huntsman, especially Jeffamine D230, Jeffamine D400, Jeffamine D2000, Jeffamine D4000, Jeffamine ED600, Jeffamine ED900, Jeffamine ED2003, Jeffamine EDR148 and Jeffamine EDR176

(designations from the product brochure from Alfa Chemicals Ltd. with the reference number "Hunt32").

The polymers prepared by means of the above-described process comprise diamine monomers of the formula

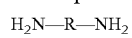

where the aforementioned diamines can be used as monomers.

The polymers comprise repeat units of the formula

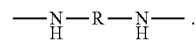

The repeat units may be joined in a linear manner or have branches.

In the case of linear linkage (L), two repeat units are joined via a secondary amine (—NH—).

A branch (D) refers to a linkage in which three repeat units are joined via a tertiary amine (—N<).

The polymers may have primary amine end groups (—NH2) (T).

From the proportion of linear linkages (L), of primary amine end groups (TO) and of branches (D), it is possible to calculate the degree of branching (DB).

DB is defined as follows:

$$DB=(D+T)/(D+T+L) \text{ where}$$

D (dendritic) corresponds to the number of tertiary amino groups in the polymer, L (linear) corresponds to the number of secondary amino groups in the polymer, and T (terminal) corresponds to the number of primary amino groups in the polymer.

The degree of branching can be found by determining the primary, secondary and tertiary amine numbers. The determination of the primary, secondary or tertiary amine number can be effected to ASTM D2074-07.

The degree of branching can also be determined qualitatively by means of $^{15}$N NMR.

Preferably, the inventive polyamines have no signal or only a weak signal in the range typical of tertiary nitrogen atoms. This can be viewed as an indicator of a low degree of branching.

The repeat units can thus be linked to give unbranched or branched polymer chains, or to give unbranched or branched polymeric rings. In the case of rings, at least two end groups of the same linear or branched chains are joined, so as to form a ring structure. The probability that two primary amine groups of the same chain will be joined to form a ring falls with the number of repeat units between the primary amine groups which are joined.

The inventive polymers may preferably have at least one, or any combination of 2 or more, of the following properties a) to i):

a) Degree of branching

The polymers generally have a high proportion of repeat units joined in a linear manner.

The degree of branching (DB) is preferably in the range from 0 to 1, more preferably in the range from 0 to 0.5 and most preferably in the range from 0.01 to 0.3.

Polymers having a low degree of branching have good processing properties. They are particularly suitable for further reactions in which the polymer is chemically modified (alkoxylation, reaction with isocyanates, reaction with acrylonitrile, reaction with epichlorohydrin, reaction with ethylene dichloride, reaction with esters/acids, quaternization with methyl chloride), since the conversion of inventive polyamines generally results in a relatively small viscosity rise compared to branched polyamines.

b) Degree of polymerization

The mean number of repeat units Pn of the monomers in the polymers is generally between 3 and 50 000.

In a particularly preferred embodiment, the polymers have a high mean molecular weight, i.e. a degree of polymerization Pn of 4 or more, preferably 10 or more, especially preferably 15 or more and most preferably 20 or more.

The number of repeat units is preferably in the range from 4 to 1000, even more preferably in the range from 10 to 500, especially preferably in the range from 15 to 100 and even more preferably in the range from 20 to 50.

Polymers having a high mean degree of polymerization Pn have good mechanical and/or processing properties.

c) Polydispersity

The polydispersity (Pw/Pn) of the polymers is generally in the range from 1.2 to 20, preferably of 1.5-7.5, where Pn is the numerical average of the degree of polymerization and Pw the weight average of the degree of polymerization.

Preferably, the polydispersity (Pw/Pn) of the polymers is in the range from 1.3 to 15, more preferably in the range from 1.5 to 10 and most preferably in the range from 2 to 7. Such polymers have a good profile of properties and have good processability.

d) Metal content

The polymers preferably have a low metal content.

The metal content is preferably less than 500 ppm, more preferably less than 100 ppm, even more preferably less than 10 ppm and especially preferably less than 1 ppm. Such polymers have low reactivity. Low reactivity means that the reaction rate of the polymers in further reactions, for example the reaction with diisocyanates to give polyureas, is low. In addition, polymers having a low metal content have elevated stability with respect to environmental influences, such as light, ultraviolet radiation, temperature or moisture.

e) Phosphorus content

The polymers preferably have a low phosphorus content.

The phosphorus content is preferably less than 500 ppm, more preferably less than 100 ppm, even more preferably less than 10 ppm and especially preferably less than 1 ppm.

Polymers having a low phosphorus content generally have elevated stability with respect to environmental influences, such as light, ultraviolet radiation, temperature or moisture.

f) Color number

The polymers additionally preferably have a low color number.

The color number is preferably less than 200 Hazen, more preferably less than 150 Hazen, even more preferably less than 100 Hazen and yet more preferably less than 80 Hazen.

The Hazen color number is preferably in the range from 0 to 200, more preferably in the range from 5 to 150, even more preferably in the range from 10 to 100 and especially preferably in the range from 20 to 60.

The Hazen color number is generally measured to ASTM D1209 or DIN 53409.

A low color number enables the use of the polymers in sectors where color is regarded as a quality feature. These are most industrial applications, especially applications in coatings, paints or adhesives.

g) OH number

In contrast to polyamines which are prepared by homogeneously catalyzed conversion of diamines and diols or by conversion of amino alcohols, the polymers preferably have a low OH number and a low degree of branching. A low OH number has the advantage that the polymers have a relatively high charge density and a relatively low water solubility.

A relatively high charge density can be advantageous in the case of use of the polymers a) as adhesion promoters, for example for printing inks for laminate films;
b) as an assistant (adhesion), for example for production of multilayer composite films, with compatibilization not just of different polymer layers but also of metal foils;
c) as adhesion promoters for adhesives, for example in conjunction with polyvinyl alcohol, butyrate and acetate and styrene copolymers, or as a cohesion promoter for label adhesives;
d) as a primer in coatings applications for improvement of adhesion on substrates such as glass, wood, plastic and metal;
e) for improvement of wet adhesion, for example in standard emulsion paints, and for improvement of instantaneous rain resistance of paints, for example for road markings;
f) as complexing agents, especially with high binding capacity for heavy metals such as Hg, Pb, Cu, Ni;
g) as a flocculant, for example in water treatment/water processing;
h) as a penetration aid, for example for active metal salt formulations in wood protection;
i) as corrosion inhibitors, for example for iron and nonferrous metals and in the sectors of petroleum production and of secondary oil production;
j) for immobilization of proteins and enzymes; microorganisms or as immobilizing supports of enzymes and microorganisms;
k) for blocking and sealing, for example mineral oil and natural gas industry;
l) as fixatives, for example in the textile industry, especially as formaldehyde-free co-fixers;
m) as an additive in the cosmetics sector, for example for hair-setting compositions and hair rinses;
n) as an assistant in the papermaking industry, for example for acceleration of dewatering, elimination of contraries, neutralization of charge and paper coating as a multipurpose assistant;
o) for separation of oil and water, for example in the metalworking industry;
p) as an additive for landfill seals;
q) as a flocculant;
r) as a swimming pool algaecide;
s) for production of bitumen chemicals by reaction with fatty acids;
t) as an antiswelling agent in order that clay absorbs water in a retarded manner;
u) as an emulsifier or emulsion breaker;
v) as a surfactant in the industrial cleaning (IC) Home, Textile and Personal Care sector;
w) as a wood protector;
x) for preparation of complexing agents (polycarboxylates);
y) for production of assistants for ore mining and mineral processing;

z) as a dispersant for pigments, ceramic, carbon black, carbon, carbon fibers, metal powders;
aa) for gas scrubbing as an absorbent of $CO_2$, $NO_x$, $SO_x$, $Cl_2$ and aldehydes, and for neutralization of acidic constituents;
bb) for water softening;
cc) as a crystallization inhibitor;
dd) as a rheology modifier (thickener);
ee) as an assistant or as a component for assistants for the extraction and processing of oil, coal and natural gas;
ff) for production of synthetic rubber and rubber chemicals;
gg) as an additive in coolants, lubricants and cooling lubricants;
hh) as assistants in the construction chemicals sector;
ii) as a constituent of galvanizing baths;
jj) for production of nonviral gene vectors;
kk) as an epoxy hardener;
ll) as a formulation agent for plant protection compositions;
mm) as a crosslinker for conformance control and selective water shut-off measures in the oil and gas production sector;
nn) as a biocide for prevention and treatment of biofilms;
oo) for production of flame retardants;
pp) as a starter for polyols, as a crosslinker and scavenger of aldehydes in the polyurethanes sector; or
qq) for preparation of polyureas.

The OH number is preferably less than 5 mg KOH/g, more preferably less than 2 mg KOH/g, even more preferably less than 1 mg KOH/g and especially preferably less than 0.5 mg KOH/g. The determination of the OH number can be effected to DIN 53240.

h) Chloride content

The polymers preferably have a low chloride content.

The chloride content is preferably less than 500 ppm, more preferably less than 100 ppm, even more preferably less than 10 ppm and especially preferably less than 1 ppm.

Polymers having a low chloride content are generally relatively noncorrosive and can find uses in the corrosion protection sector.

i) Proportion of deaminated products

The polymers preferably have a low degree of deamination.

The proportion of deaminated polymers is preferably less than 3% by weight, more preferably less than 2% by weight and especially preferably less than 1% by weight.

In a preferred embodiment, the polymers after preparation and before formulation have at least one, or any combination of at least two, of the following properties:
a) a degree of branching of 0 to 0.5, preferably 0.01 to 0.3; and/or
b) a mean degree of polymerization Pn of 5 or more, preferably in the range from 10 to 500; and/or
c) a polydispersity in the range from 1.5 to 10, preferably 2 to 7; and/or
d) a metal content of less than 10 ppm, preferably less than 1 ppm; and/or
e) a phosphorus content of less than 10 ppm, preferably less than 1 ppm; and/or
f) a color number of less than 80 Hazen, preferably in the range from 20 to 60 Hazen; and/or
g) an OH number of less than 5 mg KOH/g, preferably less than 2 mg KOH/g; and/or
h) and chloride content of less than 500 ppm and/or
i) a proportion of deaminated polymers of less than 3% by weight.

In a very particularly preferred embodiment, the abovementioned polymers have all the aforementioned properties a), b), c), d), e), f), and g).

In a very particularly preferred embodiment, the abovementioned polymers have all the aforementioned properties a), b), c), d), e), f), g), and h).

In a very particularly preferred embodiment, the abovementioned polymers have all the aforementioned properties a), b), c), d), e), f), g), h) and i).

The abovementioned polymers are preferentially suitable for the following applications:
a) as adhesion promoters, for example for printing inks for laminate films;
b) as an assistant (adhesion), for example for production of multilayer composite films, with compatibilization not just of different polymer layers but also of metal foils;
c) as adhesion promoters for adhesives, for example in conjunction with polyvinyl alcohol, butyrate and acetate and styrene copolymers, or as a cohesion promoter for label adhesives;
d) as a primer in coatings applications for improvement of adhesion on substrates such as glass, wood, plastic and metal;
e) for improvement of wet adhesion, for example in standard emulsion paints, and for improvement of instantaneous rain resistance of paints, for example for road markings;
f) as complexing agents, especially with high binding capacity for heavy metals such as Hg, Pb, Cu, Ni;
g) as a flocculant, for example in water treatment/water processing;
h) as a penetration aid, for example for active metal salt formulations in wood protection;
i) as corrosion inhibitors, for example for iron and nonferrous metals and in the sectors of gasoline production and of secondary oil production;
j) for immobilization of proteins and enzymes; microorganisms or as immobilizing supports of enzymes and microorganisms;
k) for blocking and sealing, for example mineral oil and natural gas industry;
l) as fixatives, for example in the textile industry, especially as formaldehyde-free co-fixers;
m) as an additive in the cosmetics sector, for example for hair-setting compositions and hair rinses;
n) as an assistant in the papermaking industry, for example for acceleration of dewatering, elimination of contraries, neutralization of charge and paper coating as a multipurpose assistant;
o) for separation of oil and water, for example in the metalworking industry;
p) as an additive for landfill seals;
q) as a flocculant;
r) as a swimming pool algaecide;
s) for production of bitumen chemicals by reaction with fatty acids;
t) as an antiswelling agent in order that clay absorbs water in a retarded manner;
u) as an emulsifier or emulsion breaker;
v) as a surfactant in the industrial cleaning (IC) sector;
w) as a wood protector;

x) for preparation of complexing agents (polycarboxylates);
y) for production of assistants for ore mining and mineral processing;
z) as a dispersant for pigments, ceramic, carbon black, carbon, carbon fibers, metal powders;
aa) for gas scrubbing as an absorbent of CO2, NOX, SOX, Cl2 and aldehydes, and for neutralization of acidic constituents;
bb) for water softening;
cc) as a crystallization inhibitor;
dd) as a rheology modifier (thickener);
ee) as an assistant or as a component for assistants for the extraction and processing of oil, coal and natural gas;
ff) for production of synthetic rubber and rubber chemicals;
gg) as an additive in coolants, lubricants and cooling lubricants;
hh) as assistants in the construction chemicals sector;
ii) as a constituent of galvanizing baths;
jj) for production of nonviral gene vectors;
kk) as an epoxy hardener;
ll) as a formulation agent for plant protection compositions;
mm) as a crosslinker for conformance control and selective water shut-off measures in the oil and gas production sector;
nn) as a biocide for prevention and treatment of biofilms;
oo) for production of flame retardants;
pp) as a starter for polyols, as a crosslinker and scavenger of aldehydes in the polyurethanes sector; or
qq) for preparation of polyureas.

The present invention enables
the use of a multitude of monomers, such that a great multitude of homo- and copolymers can be achieved (through the choice of monomers, the properties of the polymers prepared can be tailored),
the use of monomers which are available commercially and/or inexpensively and/or can be handled without a high level of safety measures, or which are advantageous in terms of their toxicological properties,
the preparation of polyamines from bifunctional monomers which are essentially linear and have a low level of branching,
the preparation of polyamines having a low metal content,
the preparation of polyamines having a low phosphorus content,
the preparation of polyamines which are essentially colorless or have only a low degree of color,
the preparation of polyamines having a high mean degree of polymerization,
the preparation of polyamines having a low OH number combined with a high charge density,
the preparation of polyamines with a low degree of deamination,
the preparation of polyamines having a low chloride content,
the preparation of polyamines having both a low degree of branching and a high mean degree of polymerization.

In addition, the process according to the invention may have the following advantages:
comparatively short residence times or reaction times,
the catalyst used for polymerization can be removed from polymer in a simple manner and reused for further polymerizations,
long service life and activity of the catalyst in the process, such that the frequency of complex catalyst exchanges can be reduced,
a high degree of polymerization or a high conversion of diamines can be achieved with short residence times,
the recycling of unconverted diamine can be enabled, and/or
the process can be operated continuously.

The invention is illustrated by the following examples:

EXAMPLES 1 TO 3

Polymerization of 1,3-propanediamine (1,3-PDA) to polypropylenepolyamine

The experiments were performed in a 300 ml steel pressure vessel stirred with a paddle stirrer. Via an introduction tube, if required, hydrogen (experiments 1 and 2) or nitrogen (experiment 3) was supplied. In the upper part of the pressure vessel, it was optionally possible to lead off offgas, which was conducted without cooling into the middle of a vertical steel tube (internal diameter 1.4 cm, height 16 cm). Liquid condensate obtained here was recycled into the lower part of the pressure vessel, and offgas was led off from the apparatus via the steel tube.

The catalyst precursor used consisted of 28% by weight each of NiO and CoO, 13% by weight of CuO and 31% by weight of $ZrO_2$. The shaped catalyst bodies (3×3 mm tablets) were reduced by a continuous hydrogen stream of 50 l (STP) per hour at 280° C. and standard pressure for 72 hours.

As feedstocks, 80 g of 1,3-propanediamine (1,3-PDA) were initially charged under nitrogen in the pressure vessel. 32 g of the activated catalyst were fixed in a "metal cage", through which the stirred reaction mixture flowed.

In all three experiments, the polymerization was conducted at 160° C. and total pressure 60 bar for 4 hours.

After the reaction time, the autoclave was cooled to room temperature and decompressed. The reaction mixture was removed from the autoclave.

EXAMPLE 1

Comparative Example

The experiment was conducted as described above. In the pressure vessel, a total pressure of 60 bar was maintained by injection of hydrogen over the entire experimental period. No offgas was led out of the pressure vessel.

EXAMPLE 2

The experiment was conducted as described above. Over the four hours of reaction time, 50 l (STP) of hydrogen per hour were passed continuously through the pressure vessel and disposed of. Liquid condensate was recycled into the pressure vessel.

EXAMPLE 3

The experiment was conducted like Example 2. Rather than 50 l (STP) of hydrogen, 50 l (STP) of nitrogen per hour were passed through the pressure vessel and disposed of. Liquid condensate was recycled into the pressure vessel.

The reaction outputs were analyzed by gas chromatography (% by mass) and by gel permeation chromatography (absolute calibration by measurement of defined polyamine standards). The analysis results are summarized in Table 1.

The highest molar masses were attained in Example 2, in which hydrogen was passed through the pressure vessel and this discharged the ammonia formed from the reactor. With this mode of operation, the Mn values attained were much higher and the Mw values attained were twice as high as with the modes of operation of Examples 1 and 3.

TABLE 1

| Example | GC values of the reaction output | | | | | 1,3-PDA conversion [%] | Mn[1] (g/mol) | Mw[2] (g/mol) | PDI[3] | Offgas mode[4] | H$_2$ |
|---|---|---|---|---|---|---|---|---|---|---|---|
| | 1,3-PDA | unknown | Dimer | Trimer | Tetramer | Higher | | | | | |
| 1 | 2 | | 3 | 4 | 4 | 53 | 98 | 303 | 821 | 2.7 | no | yes |
| 2 | 11 | | 1 | 2 | 2 | 71 | 89 | 464 | 1761 | 3.8 | yes | |
| 3 | 9 | 18 | 8 | 9 | 5 | 52 | 91 | 195 | 717 | 3.7 | | no |

[1] Mn = number-average molar mass
[2] Mw = mass-average molar mass
[3] PDI = Mw:Mn
[4] discharge of ammonia

EXAMPLE 4

1,3-PDA was passed continuously from the bottom upward through a catalyst of composition 4% Cu, 8% Co, 9% Ni on an alumina support. The pressure was 50 bar, the temperature 140° C.

The catalyst hourly space velocity was 0.1 kg/lh of 1,3-propanediamine.

No gas was passed through the apparatus.

The results are summarized in Table 2.

EXAMPLE 5

1,3-PDA was passed continuously from the bottom upward through a catalyst of composition 4% Cu, 8% Co, 9% Ni on an alumina support. The pressure was 50 bar, the temperature 140° C.

The catalyst hourly space velocity was 0.1 kg/lh of 1,3-propanediamine.

50 l (STP)/h of hydrogen were passed through the reactor (offgas mode).

The results are summarized in Table 2.

TABLE 2

| Example | GC values of the reaction output | | | | | | 1,3-PDA conversion [%] | Offgas mode[4] | H$_2$ |
|---|---|---|---|---|---|---|---|---|---|
| | 1,3-PDA | unknown | Dimer | Trimer | Tetramer | Higher | | | |
| 4 | 12 | 10 | 13 | 13 | 10 | 42 | 88 | no | no |
| 5 | 10 | 1 | 9 | 7 | 7 | 66 | 90 | yes | yes |

[4] dicharge of ammonia

It is clear from the table that a much greater amount of higher molecular weight compounds is obtained in offgas mode (+24%). Moreover, the conversion is much more selective, since, working without offgas mode, deaminated polyamines and further unknown substances occur in an order of magnitude of 10%, whereas only about 1% of these impurities are measured with offgas.

EXAMPLE 6

1,3-PDA was passed continuously from the bottom upward through a catalyst. The catalyst used was a cobalt catalyst having an extrudate diameter of 4 mm, the preparation of which is described in EP-A-0636409 (example catalyst A).

The pressure was 50 bar, the temperature 160° C.

The catalyst hourly space velocity was 0.8 kg/lh of 1,3-propanediamine. 10 l (STP)/h of hydrogen were passed through the reactor (offgas mode) The composition of the crude discharge is summarized in Table 3. The molar mass determination was effected after removal of mono-, di- and trimer.

The degree of branching (DB) of the polymer was determined by determining the primary, secondary and tertiary amine numbers (prim/sec/tert=269/786/11). This gives a DB of 0.26.

EXAMPLE 7

Comparative Example 1,3-PDA was passed continuously from the bottom upward through a catalyst. The catalyst used was a cobalt catalyst having an extrudate diameter of 4 mm, the preparation of which is described in EP-A-0636409 (example catalyst A).

The pressure was 50 bar, the temperature 170° C.

The catalyst hourly space velocity was 0.8 kg/lh of 1,3-propanediamine.

10 l (STP)/h of hydrogen were passed through the reactor (offgas mode) The composition of the crude discharge is summarized in Table 3. The molar mass determination was effected after removal of mono-, di- and trimer.

The degree of branching (DB) of the polymer was determined by determining the primary, secondary and tertiary amine numbers (prim/sec/tert=203/816/21). This gives a DB of 0.22.

TABLE 3

| Example | T [° C.] | 1,3-PDA | Dimer | Trimer | Tetramer | Higher | Others | Mw | PDI |
|---|---|---|---|---|---|---|---|---|---|
| 6 | 160 | 14 | 16 | 15 | 12 | 42 | 1 | 405 | 1.4 |
| 7 | 170 | 8 | 9 | 12 | 10 | 56 | 5 | 524 | 1.6 |

EXAMPLE 8

The procedure is as in example 7, except that the temperature is 160° C. The catalyst hourly space velocity was 0.4 kg per liter of catalyst and hour for 1,3-diaminopropane and 0.4 kg per liter of catalyst and hour for tetrahydrofuran. The mean molecular weight of the polymer mixture attained as a result was 335 g/mol.

EXAMPLE 9

The procedure is as in example 7, except that the temperature is 160° C. The catalyst hourly space velocity was 0.4 kg per liter of catalyst and hour for 1,3-diaminopropane and 0.4 kg per liter of catalyst and hour for dimethoxyethane. The mean molecular weight of the polymer mixture attained as a result was 386 g/mol.

EXAMPLE 10

The procedure is as in example 7, except that the temperature is 160° C. The catalyst hourly space velocity was 0.4 kg per liter of catalyst and hour for 1,3-diaminopropane and 0.4 kg per liter of catalyst and hour for toluene. The mean molecular weight of the polymer mixture attained as a result was 507 g/mol.

TABLE 4

| Example | T [° C.] | 1,3-PDA | Dimer | Trimer | Tetramer | Others | Higher | Mw | PDI |
|---|---|---|---|---|---|---|---|---|---|
| 8 | 160 | 27 | 24 | 19 | 10 | 2 | 18 | 335 | 1.3 |
| 9 | 160 | 20 | 18 | 15 | 9 | 1 | 37 | 386 | 1.3 |
| 10 | 160 | 8 | 14 | 14 | 10 | 1 | 53 | 507 | 1.4 |

EXAMPLE 11

The procedure is as in example 7, except that the temperature is 165° C. The catalyst hourly space velocity was 0.2 kg per liter of catalyst and hour for "Polyetheramine D230". The mean molecular weight of the polymer mixture attained as a result was 745 g/mol.

EXAMPLE 12

The procedure is as in example 7, except that the temperature is 160° C. The catalyst hourly space velocity was 0.1 kg per liter of catalyst and hour for Jeffamine EDR-148. The mean molecular weight of the polymer mixture attained as a result was 788 g/mol.

EXAMPLE 13

The procedure is as in example 7, except that the temperature is 160° C. The catalyst hourly space velocity was 0.5 kg per liter of catalyst and hour for 4,9-dioxadodecane-1,12-diamine. The mean molecular weight of the polymer mixture attained as a result was 1469 g/mol.

EXAMPLE 14

The procedure is as in example 7, except that the temperature is 160° C. The catalyst hourly space velocity was 0.5 kg per liter of catalyst and hour for 4,7,10-trioxatridecane-1,13-diamine. The mean molecular weight of the polymer mixture attained as a result was 1782 g/mol.

EXAMPLE 15

The procedure is as in example 7, except that the temperature is 160° C. The catalyst hourly space velocity was 0.2 kg per liter of catalyst and hour for N,N-bis(3-aminopropyl)methylamine. The mean molecular weight of the polymer mixture attained as a result was 1696 g/mol.

EXAMPLE 16

The procedure is as in example 7, except that the temperature is 150° C. The catalyst hourly space velocity was 0.4 kg per liter of catalyst and hour for hexamethylenediamine. The mean molecular weight of the polymer mixture attained as a result was 1169 g/mol.

EXAMPLE 17

The procedure is as in example 7, except that the temperature is 160° C. The catalyst hourly space velocity was 0.2 kg per liter of catalyst and hour for 3-methylaminopropylamine. The mean molecular weight of the polymer mixture attained as a result was 1086 g/mol.

EXAMPLE 18

The procedure is as in example 7, except that the temperature is 160° C. The catalyst hourly space velocity was 0.2 kg per liter of catalyst and hour for N,N'-bis(3-aminopropyl)ethylenediamine. The mean molecular weight of the polymer mixture attained as a result was 538 g/mol.

EXAMPLE 19

The procedure is as in example 7, except that the temperature is 160° C. The catalyst hourly space velocity was 0.8 kg per liter of catalyst and hour for 1,3-diaminopropane in a mixture with 10 percent by weight of N,N-bis(3-aminopropyl)methylamine. The mean molecular weight of the polymer mixture attained as a result was 427 g/mol.

| Example | T [° C.] | Monomer | Dimer | Trimer | Others | Higher | Mw | PDI |
|---|---|---|---|---|---|---|---|---|
| 11 | 160 | 11 | 15 | 9 | 22 | 43 | 745 | 1.2 |
| 12 | 160 | 13 | 15 | — | 21 | 51 | 788 | 1.3 |
| 13 | 160 | 7 | — | — | 1 | 92 | 1469 | 1.5 |
| 14 | 160 | 4 | — | — | 3 | 93 | 1782 | 1.6 |
| 15 | 160 | 1 | — | — | 8 | 91 | 1696 | 1.8 |
| 16 | 150 | 11 | 2 | — | 18 | 69 | 1169 | 1.5 |
| 17 | 160 | 1 | — | — | 20 | 79 | 1086 | 1.6 |
| 18 | 160 | 13 | — | — | 23 | 64 | 538 | 1.5 |
| 19 | 160 | 22 | 18 | 14 | 11 | 22 | 427 | 1.3 |

The invention claimed is:

1. A process for preparing a polyamine in a reactor by conversion of a diamine present in a liquid phase in the presence of a catalyst present in a solid phase, at a temperature of from 50 to 200° C. and a pressure of from 1 to 400 bar,
the process comprising:
supplying a gas to the reactor, wherein an amount of gas supplied is from 1 to 1000 liters of gas per liter of free reactor volume per hour; and
introducing the gas into the liquid phase and removing the gas from the reactor together with ammonia which is formed in the conversion.

2. The process according to claim 1, wherein the gas is an inert gas.

3. The process according to claim 1, wherein the gas comprises hydrogen.

4. The process according to claim 1, wherein the gas comprises exclusively hydrogen.

5. The process according to claim 1, wherein the gas supplied is dispersed in the liquid phase.

6. The process according to claim 5, wherein a temperature in the reactor is 165° C. or less.

7. The process according to claim 1, wherein the conversion of the diamines is performed continuously.

8. The process according to claim 7, wherein a catalyst hourly space velocity in continuous mode is from 0.1 to 1.5 kg of diamine per liter of catalyst per hour, or a residence time in batchwise mode is from 0.5 to 3 hours.

9. The process according to claim 1, wherein the gas is removed from the reactor separately from the liquid phase.

10. The process according to claim 9, wherein ammonia is condensed out of the gas stream, to obtain a gas stream essentially free of ammonia, and a liquid stream comprising ammonia, and the gas removed from ammonia is optionally recycled into the reactor.

11. The process according to claim 1, wherein entrained diamines and oligomers of the diamine are removed from the gas stream prior to removal of the ammonia.

12. The process according to claim 2, wherein entrained diamines and oligomers of the diamine are removed from the gas stream by flash evaporation.

13. The process according to claim 1, wherein the gas is removed from the reactor together with at least a portion of the liquid phase.

14. The process according to claim 5, further comprising decompressing the liquid phase, which is removed into a column, such that gas and ammonia are drawn off at a top of the column and the polyamine is drawn off at a bottom of the column.

15. The process according to claim 14, wherein the gas drawn off at the top is partially condensed so as to obtain a gas comprising essentially no ammonia, and an ammonia-containing liquid phase.

16. The process according to claim 14, wherein diamines and oligomers of the diamine are removed from a side draw of the column and are optionally recycled into the reactor.

17. The process according to claim 14, wherein the bottoms from the column are introduced into a second column and diamines and oligomers of the diamine are removed at a top of the second column and the polyamine is drawn off at a bottom of the second column.

18. The process according to claim 7, wherein a side draw product comprising oligomers of the diamine is removed from a second column and may be recycled into the process.

19. The process according to claim 1, wherein gas recycled into the reactor, diamines, or both, or oligomers of the diamine recycled into the reactor comprise essentially no ammonia.

20. A polyamine obtained by the process according to claim 1 by conversion of a diamine, which has:
a) a degree of branching of from 0 to 0.5;
b) a mean degree of polymerization Pn of 5 or more;
c) a polydispersity of from 1.5 to 10;
d) a metal content of less than 10 ppm;
e) a phosphorus content of less than 10 ppm;
f) a color number of less than 80 Hazen;
g) an OH number of less than 5 mg KOH/g;
h) a chloride content of less than 500 ppm; and
i) a proportion of deaminated polymers of less than 3% by weight.

21. A process for promoting adhesion, comprising contacting an adhesive comprising the polyamine according to claim 20 to a substrate in need thereof.

22. The process according to claim 1, wherein the conversion of the diamines is performed batchwise.

* * * * *